United States Patent
Kumar et al.

(10) Patent No.: US 12,004,032 B2
(45) Date of Patent: Jun. 4, 2024

(54) NESTED CONDITIONAL MOBILITY PROCEDURES

(71) Applicant: QUALCOMM Incorporated, San Diego, CA (US)

(72) Inventors: Rajeev Kumar, San Diego, CA (US); Punyaslok Purkayastha, San Diego, CA (US); Ozcan Ozturk, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 17/398,876

(22) Filed: Aug. 10, 2021

(65) Prior Publication Data
US 2023/0047617 A1   Feb. 16, 2023

(51) Int. Cl.
*H04W 36/00* (2009.01)
*H04W 36/30* (2009.01)

(52) U.S. Cl.
CPC . *H04W 36/00837* (2018.08); *H04W 36/0061* (2013.01); *H04W 36/305* (2018.08)

(58) Field of Classification Search
CPC ......... H04W 36/0005; H04W 36/0016; H04W 36/34; H04W 36/0061; H04W 36/0069; H04W 36/0083; H04W 36/00837; H04W 36/305
See application file for complete search history.

(56) References Cited

U.S. PATENT DOCUMENTS

| | | | |
|---|---|---|---|
| 2021/0258843 A1* | 8/2021 | Awada | H04W 36/0069 |
| 2022/0303853 A1* | 9/2022 | Chen | H04W 36/00835 |
| 2022/0394578 A1* | 12/2022 | Wu | H04W 36/00837 |
| 2022/0394583 A1* | 12/2022 | Deenoo | H04W 74/0841 |
| 2023/0097891 A1* | 3/2023 | Zhang | H04W 36/0061 370/331 |
| 2023/0103163 A1* | 3/2023 | Xu | H04W 36/0016 370/331 |

(Continued)

FOREIGN PATENT DOCUMENTS

| | | | |
|---|---|---|---|
| EP | 3972338 A1 * | 3/2022 | |
| WO | 2021015659 A1 | 1/2021 | |

(Continued)

OTHER PUBLICATIONS

English translation of application No. 10-2020-0129697 (Year: 2020).*

(Continued)

Primary Examiner — Kan Yuen
(74) Attorney, Agent, or Firm — Patterson & Sheridan LLP

(57) ABSTRACT

Aspects of the present disclosure provide apparatus, methods, processing systems, and computer readable mediums for a nested conditional mobility procedure. In some cases, a method for wireless communications by a UE generally includes receiving configuration information configuring the UE for conditional handover (CHO) from a source master node (S-MN) to a target master node (T-MN) and for conditional primary secondary cell (PSCell) addition or change (CPAC) and performing a nested procedure based on an evaluation of conditions for both CHO and CPAAC in accordance with the configuration information.

27 Claims, 22 Drawing Sheets

(56) References Cited

U.S. PATENT DOCUMENTS

2023/0180075 A1* 6/2023 Cui .................. H04W 74/0833 370/331

FOREIGN PATENT DOCUMENTS

WO         2021109394 A1    6/2021
WO     WO-2022060195 A1 *   3/2022

OTHER PUBLICATIONS

English translation of application No. EP20196944.1 (Year: 2020).*
3GPP TSG-RAN3 Meeting #107bis-e, ZTE, China Telecom, Title: (TP for NR_Mob_enh BL CR for TS 37.340) Further Discussion of Parallel CHO and CPC Simultaneous Operation, R3-201890, 15.3.1.1 (Year: 2020).*
CATT (Rapporteur): "Report on Email Discussion [107b#52] [NR MobE] Open Issues Conditional PSCell Addition/ Change (CATT)", R2-1916300, 3GPP TSG-RAN WG2 Meeting #1 08, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 23, 2019, XP051828822, 46 Pages, The Whole Document.
CMCC: "Combination of CPAC and Cho", R2-2108533, 3GPP TSG-RAN WG2 Meeting #115 electronic, 3rd Generation Partnership Project (3GPP), Mobile Competence Centre, 650, Route Des Lucioles, F-06921 Sophia-Antipolis Cedex, France, vol. RAN WG2, No. Electronic, Aug. 16, 2021-Aug. 27, 2021, Aug. 6, 2021, XP052034873, 2 Pages, The whole document.
InterDigital, et al., "Coexistence of CHO and CPC", R2-2108491, 3GPP RAN WG2 Meeting #115-e, 3rd Generation Partnership Project (3GPP), Mobile Competence Centre, 650, Route Des Lucioles, F-06921 Sophia-Antipolis Cedex, France, vol. RAN WG2, No. Electronic, Aug. 16, 2021-Aug. 27, 2021, Aug. 6, 2021, XP052034832, 4 pages, pp. 1-2.
International Search Report and Written Opinion—PCT/US2022/037736—ISA/EPO—dated Oct. 17, 2022.

* cited by examiner

NESTED CONDITIONAL MOBILITY PROCEDURES

BACKGROUND

Field of the Disclosure

Aspects of the present disclosure relate to wireless communications, and more particularly, to techniques that may help improve (optimize) certain enhanced mobility procedures.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or a DU may communicate with a set of UEs on downlink channels (e.g., for transmissions from the BS or the DU to the UE) and uplink channels (e.g., for transmissions from the UE to the BS or the DU).

These multiple access technologies have been adopted in various telecommunication standards to provide a common protocol that enables different wireless devices to communicate on a municipal, national, regional, and even global level. The NR (e.g., new radio or 5G) is an example of an emerging telecommunication standard. The NR is a set of enhancements to the LTE mobile standard promulgated by 3GPP. The NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, the NR supports beamforming, multiple-input multiple-output (MIMO) antenna technology, and carrier aggregation.

However, as the demand for mobile broadband access continues to increase, there exists a need for further improvements in the NR and the LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that may include desirable communication in multiple access technology such as multi-radio dual connectivity.

Certain aspects provide a method for wireless communications by a user equipment (UE). The method generally includes receiving configuration information configuring the UE for conditional handover (CHO) from a source master node (S-MN) to a target master node (T-MN) and for conditional primary secondary cell (PSCell) addition or change (CPAC) and performing a nested procedure based on an evaluation of conditions for both CHO and CPAC in accordance with the configuration information.

Certain aspects provide a method for wireless communications by a source master node (S-MN). The method generally includes transmitting, to a user equipment (UE), configuration information configuring the UE for conditional handover (CHO) from the S-MN to a target master node (T-MN) and for conditional primary secondary cell (PSCell) addition or change (CPAC) and participating in a nested procedure with the UE based on an evaluation of conditions for both CHO and CPAC by the UE in accordance with the configuration information.

Aspects of the present disclosure also provide various apparatus, means, and computer readable mediums for (or capable of) performing operations described above.

To the accomplishment of the foregoing and related ends, the one or more aspects including the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
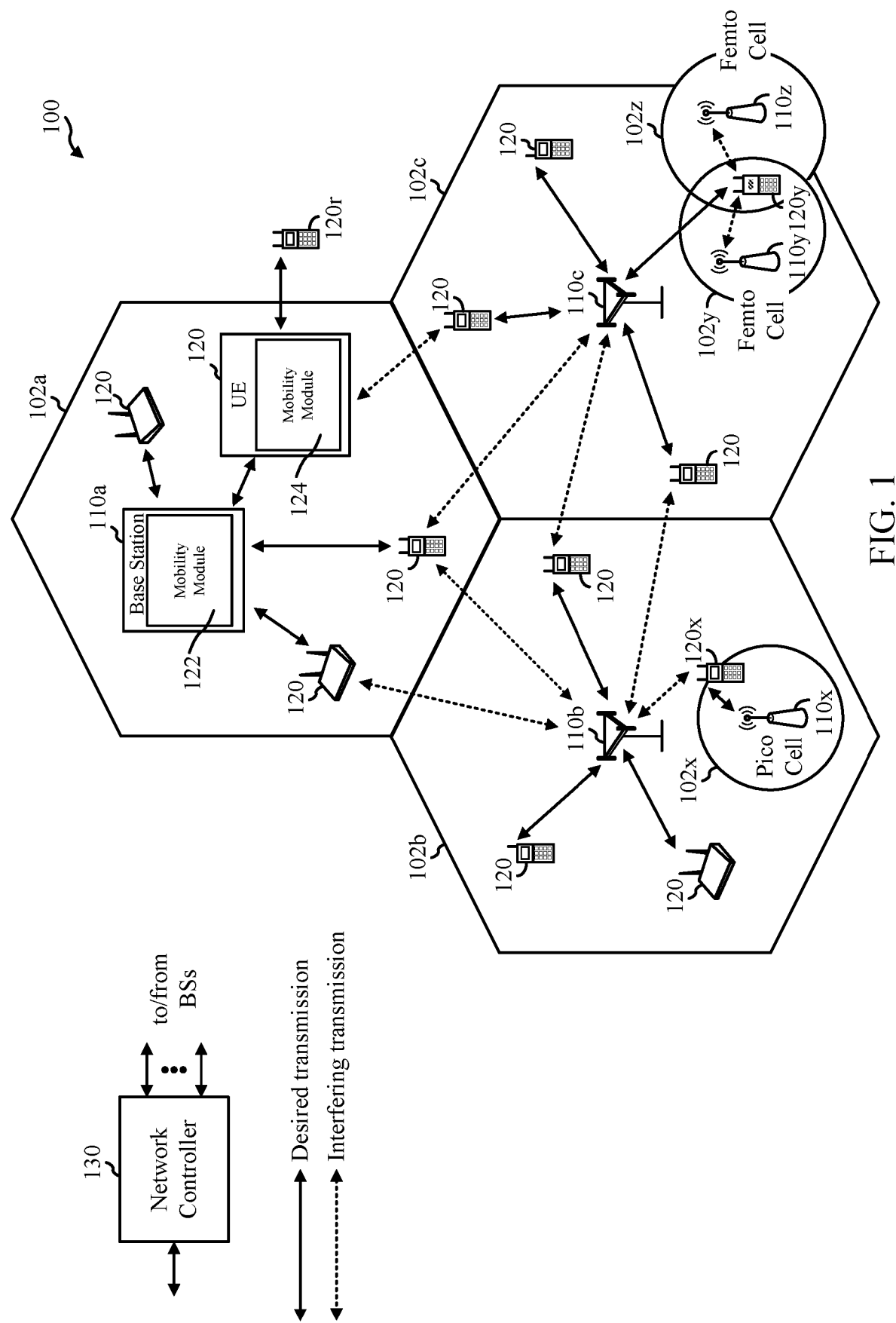
FIG. 1 is a block diagram conceptually illustrating an example wireless system, in accordance with certain aspects of the present disclosure.

Aspects of the present disclosure provide apparatus, methods, processing systems, and computer readable mediums to perform a nested conditional mobility procedure.

The techniques presented herein may take advantage of devices that support both conditional handover (CHO) and Conditional Primary Secondary Cell (PSCell) addition or change (CPAC) procedures. The nested approach may have certain potential advantages, for example, providing additional approaches for supporting robust mobility with reduced signaling between UE and network. This can help in achieving a high quality of services and quality of experience at the UE.

CHO procedures are designed to increase the robustness of handovers and to reduce the number of radio link failures (RLFs). CHO generally involves multiple stages. In a first stage, the UE sends a measurement report, to a source gNB, with potential target gNBs. Upon receiving this report from the UE, the source gNB prepares those target gNBs and communicates this same back to the UE. CHO, thus, helps reduce latency and increase reliability by early preparation of the target cells and relies on early measurement reports. The measurement report indicates whether a condition is met, in which case a handover to one of the target gNBs is initiated. A condition is typically considered met, and the conditional handover command is executed, when the serving cell goes bad and/or a target cell becomes sufficiently good (e.g., based on configured thresholds).

CPAC generally refers to a scenario where a UE has received a network configuration for initiating access to a candidate PSCell, either to consider the PSCell as suitable for SN addition (e.g., if operating in standalone/SA mode) or SN change (e.g., if operating in a multi-RAT Dual Connectivity/MR-DC mode) including intra-SN change, based on configured conditions. While the network typically decides when to use CPAC, the UE evaluates when conditions are met.

The present disclosure addresses various example scenarios for a UE configured for both CHO and CPAC. The example scenarios include when the UE completes a CHO or CPAC (S-MN), whichever is triggered first, when the UE completes CHO or CPAC (S-MN), whichever is triggered first, and when a UE (capable of performing CHO and CPAC in parallel), starts the procedure for CPAC and CHO in parallel, if both CHO and CPAC are triggered.

The following description provides examples of techniques for performing a nested conditional mobility procedure, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as long-term evolution (LTE), code division multiple access (CDMA), time division multiple access (TDMA), frequency division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as New Radio (NR) (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3rd Generation Partnership Project (3GPP) LTE and LTE-Advanced (LTE-A) are releases of UMTS that use E-UTRA. UTRA, E-UTRA, UMTS, LTE, LTE-A and GSM are described in documents from an organization named 3GPP. CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These wireless communication services may include latency and reliability requirements. These wireless communication services may also have different transmission time intervals (TTI) to meet respective quality of service (QoS) requirements. In addition, these wireless communication services may co-exist in the same subframe.

The teachings herein may be incorporated into (e.g., implemented within or performed by) a variety of wired or wireless apparatuses (e.g., nodes). In some aspects, a wireless node implemented in accordance with the teachings herein may comprise an access point (AP) or an access terminal (AT).

The AP may comprise, be implemented as, or known as a node B (NB), a radio network controller (RNC), an evolved node B (eNB), a base station controller (BSC), a base transceiver station (BTS), a base station (BS), a transceiver function (TF), a radio router, a radio transceiver, a basic service set (BSS), an extended service set (ESS), a radio base station ("RBS"), an integrated access and backhauling (IAB) node (e.g., an IAB donor node, an IAB parent node, and an IAB child node), or some other terminology.

The AT may comprise, be implemented as, or known as a subscriber station, a subscriber unit, a mobile station, a remote station, a remote terminal, a user terminal, a user agent, a user device, a user equipment (UE), a user station, or some other terminology. In some implementations, the AT may comprise a cellular telephone, a cordless telephone, a session initiation protocol (SIP) phone, a wireless local loop (WLL) station, a personal digital assistant (PDA), a handheld device having wireless connection capability, a station (STA), or some other suitable processing device connected to a wireless modem (such as an augmented reality (AR)/virtual reality (VR) console and headset). Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communications System

FIG. 1 illustrates an example wireless communication network 100 in which aspects of the present disclosure may be performed. For example, as shown in FIG. 1, a BS 110a may include Mobility Module 122, which may be designed and configured to provide information to a UE 120 to help optimize power savings for corresponding forwarding operations. As illustrated, the UE 120 may also have a Mobility Module 124, for example, to perform forwarding operations in a manner that saves power, based on information received. In some cases, the UE 120 may be configured to perform operations 700 of FIG. 7, while the BS 110a may be configured to perform operations 800 of FIG. 8.

The wireless communication network 100 may, for example, be a NR or 5G network. As illustrated in FIG. 1, the wireless communication network 100 may include a number of BSs (or APs) 110a-z (each also individually referred to herein as BS 110 or collectively as APs 110) and other network entities. A BS 110 may be a station that communicates with UEs 120a-y (each also individually referred to herein as UE 120 or collectively as UEs 120). Each BS 110 may provide communication coverage for a particular geographic area. In 3GPP, the term "cell" can refer to a coverage area of a NB and/or a NB subsystem serving this coverage area, depending on the context in which the term is used. In NR systems, the term "cell" and next generation NB (for example, gNB or gNodeB), NR AP, 5G NB, or transmission reception point (TRP) may be interchangeable. In some examples, the cell may not necessarily be stationary, and the geographic area of the cell may move according to a location of a mobile BS 110. In some examples, the APs 110 may be interconnected to one another and/or to one or more other APs 110 or network nodes (not shown) in the wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. The RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, the NR or 5G RAT networks may be deployed.

The BS 110 may provide communication coverage for a macro cell, a pico cell, a femto cell, and/or other types of cells. The macro cell may cover a relatively large geographic area (e.g., several kilometers in radius) and may allow unrestricted access by the UEs 120 with service subscription. The pico cell may cover a relatively small geographic area and may allow unrestricted access by UEs with service subscription. A femto cell may cover a relatively small geographic area (e.g., a home) and may allow restricted access by the UEs 120 having an association with the femto cell (e.g., the UEs 120 in a closed subscriber group (CSG), the UEs 120 for users in the home, etc.). The AP for a macro cell may be referred to as a macro AP. The BS 110 for a pico cell may be referred to as a pico AP. The BS 110 for a femto cell may be referred to as a femto AP or a home AP. In the example shown in FIG. 1, the APs 110*a*, 110*b* and 110*c* may be macro APs for the macro cells 102*a*, 102*b* and 102*c*, respectively. The BS 110*x* may be a pico AP for a pico cell 102*x*. The APs 110*y* and 110*z* may be femto APs for the femto cells 102*y* and 102*z*, respectively. The BS 110 may support one or multiple (e.g., three) cells.

The wireless communication network 100 may also include relay stations. A relay station is a station that receives a transmission of data and/or other information from an upstream station (e.g., the BS 110 or the UE 120) and sends a transmission of the data and/or other information to a downstream station (e.g., the UE 120 or the BS 110). The relay station may also be the UE 120 that relays transmissions for other UEs 120. In the example shown in FIG. 1, a relay station may communicate with the BS 110*a* and a UE 120*r* in order to facilitate communication between the BS 110*a* and the UE 120*r*. The relay station may also be referred to as an IAB node, a relay AP, a relay, etc.

The wireless communication network 100 may be a heterogeneous network that includes APs 110 of different types, e.g., macro AP, pico AP, femto AP, relays, etc. These different types of APs 110 may have different transmit power levels, different coverage areas, and different impact on interference in the wireless communication network 100. For example, the macro AP may have a high transmit power level (e.g., 20 Watts) whereas the pico AP, the femto AP, and the relays may have a lower transmit power level (e.g., 1 Watt).

The wireless communication network 100 may support synchronous or asynchronous operation. For synchronous operation, the APs 110 may have similar frame timing, and transmissions from the different APs 110 may be approximately aligned in time. For asynchronous operation, the APs 110 may have different frame timing, and transmissions from the different APs 110 may not be aligned in time. The techniques described herein may be used for both synchronous and asynchronous operation.

A network controller 130 may couple to a set of APs 110 and provide coordination and control for these APs 110. The network controller 130 may communicate with the APs 110 via a backhaul. The APs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE 120 may be stationary or mobile. The UE 120 may also be referred to as a mobile station, a terminal, an AT, a subscriber unit, a station, a customer premises equipment (CPE), a cellular phone, a smart phone, a PDA, a wireless modem, a wireless communication device, a handheld device, a laptop computer, a cordless phone, a WLL station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, an industrial manufacturing equipment, a global positioning system device, or any other suitable device that is configured to communicate via a wireless or wired medium. Some UEs may be considered machine-type communication (MTC) devices or evolved MTC (eMTC) devices. The MTC and the eMTC UEs may include, for example, robots, drones, remote devices, sensors, meters, monitors, location tags, etc., that may communicate with an BS 110, another device (e.g., remote device), or some other entity. A wireless node may provide, for example, connectivity for or to a network (e.g., a wide area network such as Internet or a cellular network) via a wired or wireless communication link. Some UEs 120 may be considered Internet-of-Things (IoT) devices, which may be narrowband IoT (NB-IoT) devices.

Certain wireless networks (e.g., LTE) utilize orthogonal frequency division multiplexing (OFDM) on DL and single-carrier frequency division multiplexing (SC-FDM) on UL. The OFDM and the SC-FDM partition the system bandwidth into multiple (K) orthogonal subcarriers, which are also commonly referred to as tones, bins, etc. Each subcarrier may be modulated with data. In general, modulation symbols are sent in a frequency domain with the OFDM and in a time domain with the SC-FDM. The spacing between adjacent subcarriers may be fixed, and a total number of subcarriers (K) may be dependent on a system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for the system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for the system bandwidth of 1.25, 2.5, 5, 10 or 20 MHz, respectively.

While aspects of the examples described herein may be associated with the LTE technologies, aspects of the present disclosure may be applicable with other wireless communications systems, such as the NR. The NR may utilize OFDM with a CP on the uplink and the downlink and include support for half-duplex operation using time division duplex (TDD). Beamforming may be supported and beam direction may be dynamically configured. Multiple-input and multiple-output (MIMO) transmissions with precoding may also be supported. MIMO configurations in the DL may support up to 8 transmit antennas with multi-layer DL transmissions up to 8 streams and up to 2 streams per UE 120. Multi-layer transmissions with up to 2 streams per UE 120 may be supported. Aggregation of multiple cells may be supported with up to 8 serving cells.

In some examples, access to the air interface may be scheduled. A scheduling entity (e.g., the BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. The APs 110 are not the only entities that may function as the scheduling entity. In some examples, the UE 120 may function as a scheduling entity and may schedule resources for one or more subordinate entities (e.g., one or more other UEs 120), and the other UEs 120 may utilize the resources scheduled by the UE 120 for wireless communication. In some examples, the UE 120 may function as the scheduling entity in a peer-to-peer (P2P) network, and/or in a mesh network. In a mesh network example, the UEs 120 may communicate directly with one another in addition to communicating with the scheduling entity.

In FIG. 1, a solid line with double arrows indicates desired transmissions between the UE 120 and the serving BS 110, which is the BS 110 designated to serve the UE 120 on the DL and/or the UL. A finely dashed line with double arrows indicates interfering transmissions between the UE 120 and the BS 110.

Figure 2:
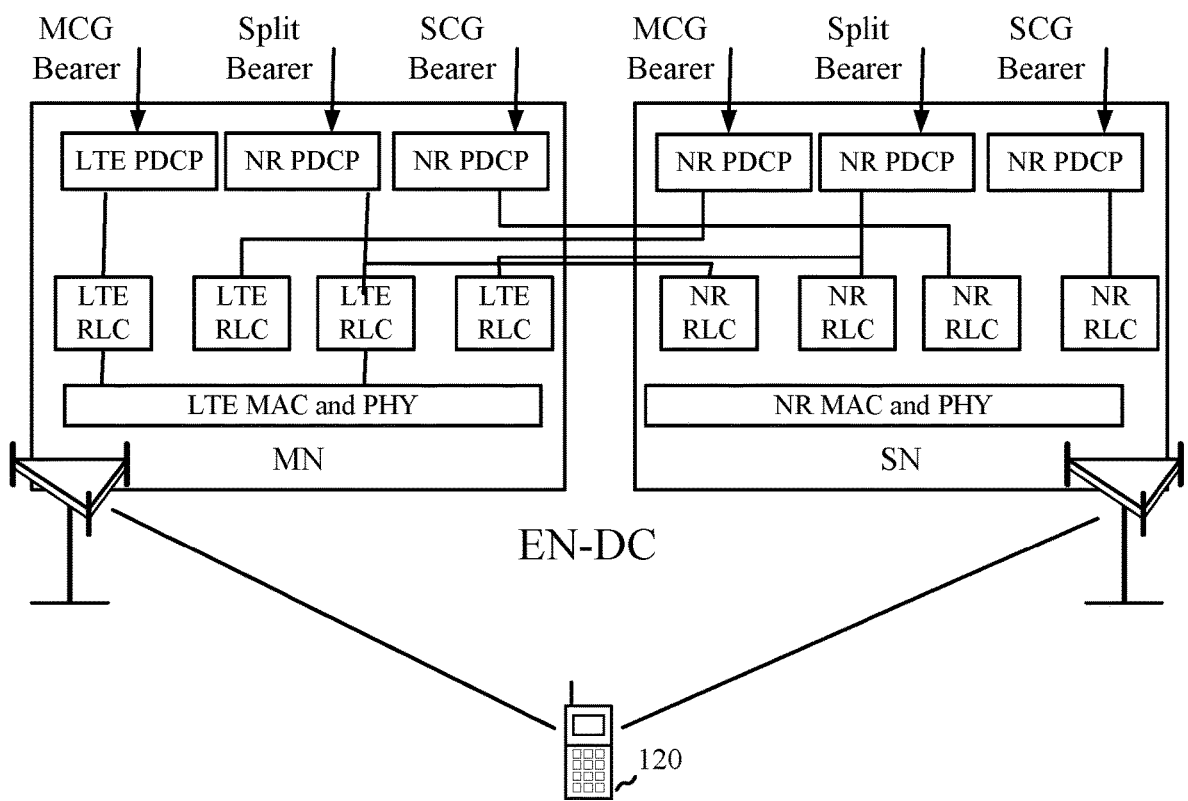
FIG. 2 is a block diagram conceptually illustrating an example dual connectivity (DC) scenario, in accordance with certain aspects of the present disclosure.

FIG. 2 illustrates an example E-UTRAN NR Dual Connectivity (EN-DC) scenario, in which aspects of the present disclosure may be implemented. For example, a UE 120 may perform a nested CHO and CPAC procedure described herein to perform conditional handover from a source master node (MN) to a target MN and/or to change or add a secondary node (SN). As shown in FIG. 2, in the EN-DC scenario, the MN may be LTE, while the SN may be 5G/NR.

Figure 3:
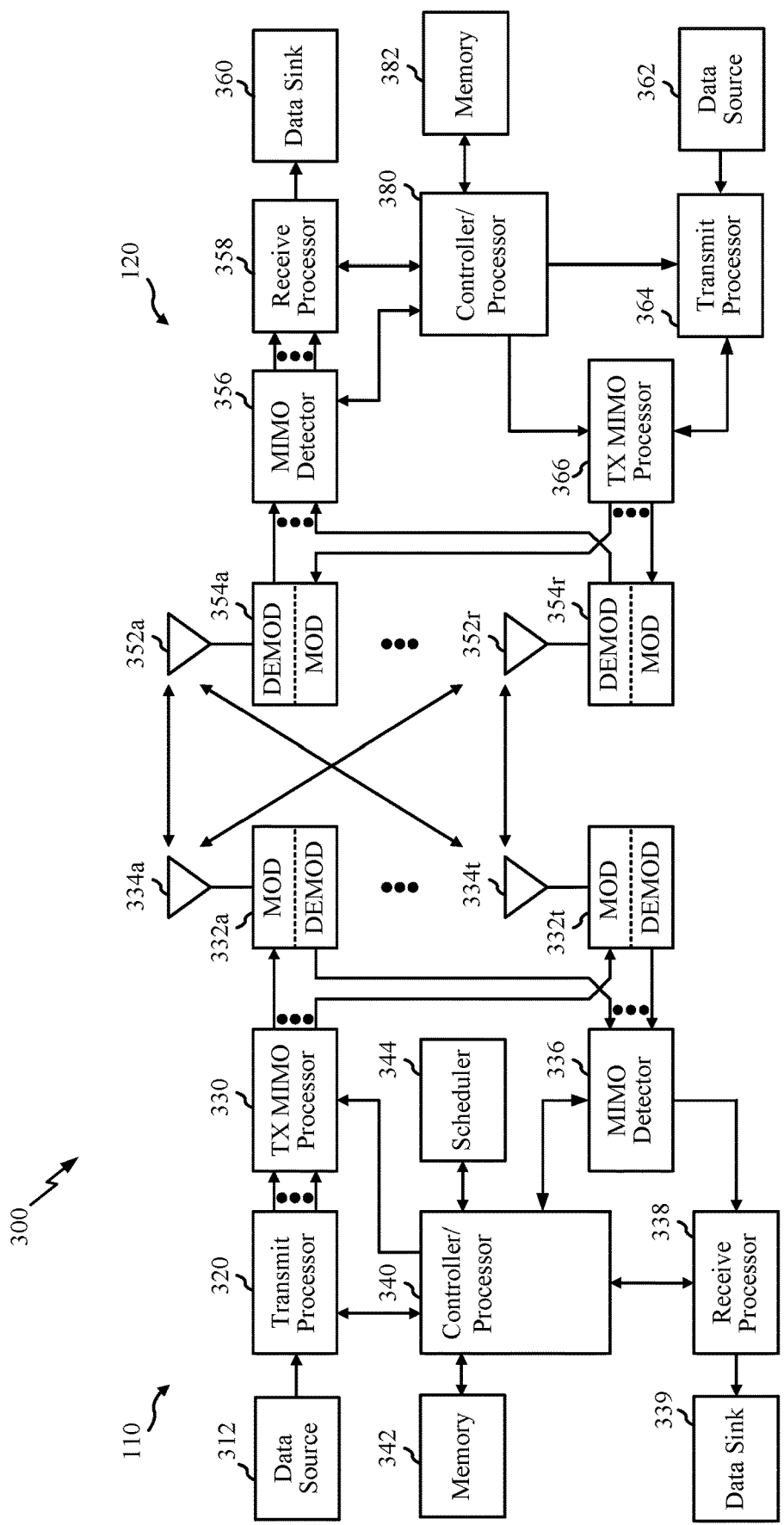
FIG. 3 illustrates example components of a base station (BS) and a user equipment (UE), in accordance with certain aspects of the present disclosure.

FIG. 3 illustrates example components 300 of BS 110 and UE 120 (as depicted in FIG. 1), which may be used to implement aspects of the present disclosure. For example, antennas 352, processors 366, 358, 364, and/or a controller/processor 380 of the UE 120 and/or antennas 334, processors 320, 330, 338, and/or a controller/processor 340 of the BS 110 may be used to perform various techniques and methods described herein with respect to FIG. 7 and FIG. 8.

At the BS 110, a transmit processor 320 may receive data from a data source 312 and control information from the controller/processor 340. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for a physical downlink shared channel (PDSCH), etc. The processor 320 may process (e.g., encode and symbol map) the data and the control information to obtain data symbols and control symbols, respectively. The transmit processor 320 may also generate reference symbols, e.g., for a primary synchronization signal (PSS), a secondary synchronization signal (SSS), and a cell-specific reference signal (CRS). A transmit MIMO processor 330 may perform spatial processing (e.g., precoding) on the data symbols, the control symbols, and/or the reference symbols, if applicable, and may provide output symbol streams to the modulators (MODs) 332a through 332t. Each MOD 332 may process a respective output symbol stream (e.g., for OFDM, etc.) to obtain an output sample stream. Each MOD may further process (e.g., convert to analog, amplify, filter, and upconvert) the output sample stream to obtain a DL signal. The DL signals from MODs 332a through 332t may be transmitted via the antennas 334a through 334t, respectively.

At the UE 120, the antennas 352a through 352r may receive the DL signals from the BS 110 and may provide received signals to the demodulators (DEMODs) in transceivers 354a through 354r, respectively. Each DEMOD in the transceiver 354 may condition (e.g., filter, amplify, downconvert, and digitize) a respective received signal to obtain input samples. Each DEMOD in the transceiver 354 may further process the input samples (e.g., for OFDM, etc.) to obtain received symbols. A MIMO detector 356 may obtain received symbols from all the DEMODs in the transceivers 354a through 354r, to perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the UL, at the UE 120, a transmit processor 364 may receive and process data (e.g., for a physical uplink shared channel (PUSCH)) from a data source 362 and the control information (e.g., for a physical uplink control channel (PUCCH)) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the DEMODs in the transceivers 354a through 354r (e.g., for SC-FDM, etc.), and transmitted to the BS 110. At the BS 110, the UL signals from the UE 120 may be received by the antennas 334, processed by the MODs 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the BS 110 and the UE 120, respectively. The processor 340 and/or other processors and modules at the BS 110 may perform or direct the execution of processes for the techniques described herein. Memories 342 and 382 may store data and program codes for the BS 110 and UE 120, respectively. A scheduler 344 may schedule the UEs for data transmission on the DL and/or the UL.

Figure 4:
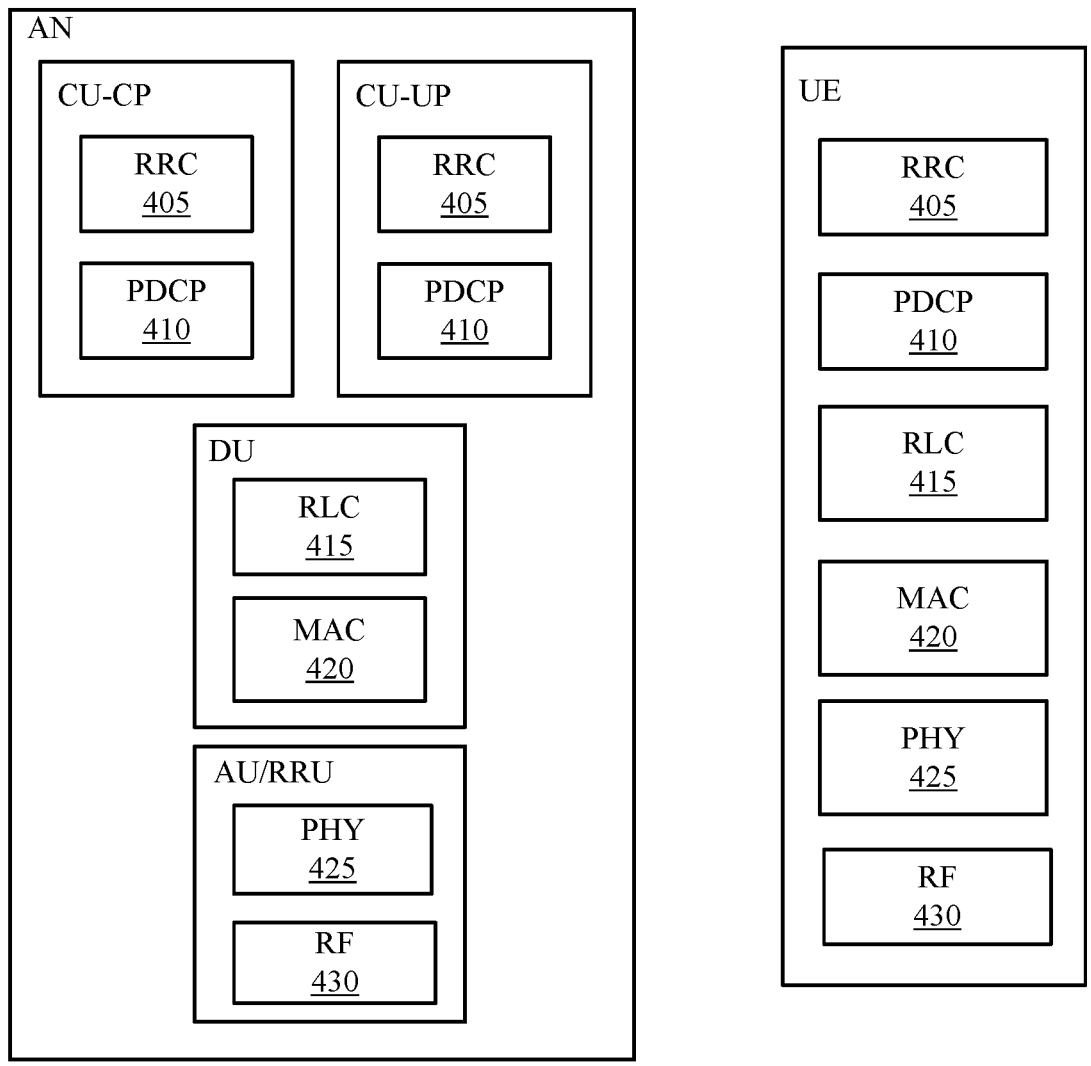
FIG. 4 is a block diagram illustrating an example communications protocol stack in a RAN, in accordance with certain aspects of the present disclosure.

FIG. 4 illustrates a diagram showing examples for implementing a communications protocol stack 400 in a RAN (e.g., such as the RAN 200), according to aspects of the present disclosure. The communications protocol stack 400 may be implemented by devices operating in a wireless communication system, such as a 5G NR system (e.g., the wireless communication network 100 of FIG. 1). In various examples, layers of the communications protocol stack 400 may be implemented as separate modules of software, portions of a processor or application specific integrated circuit (ASIC), portions of non-collocated devices connected by a communications link, or various combinations thereof. Collocated and non-collocated implementations may be used, for example, in a protocol stack for a network access device or a UE. As shown in FIG. 4, the wireless communication system may support various services 402 over one or more protocols. One or more protocol layers of the communication protocol stack 400 may be implemented by an AN (e.g., AN 208 in FIG. 2, or BS 110a in FIG. 1) and/or the UE (e.g., UE 120).

As shown in FIG. 4, the communication protocol stack 400 is split in the AN. A RRC layer 405, a PDCP layer 410, a RLC layer 415, a MAC layer 420, a PHY layer 425, and a RF layer 430 may be implemented by the AN. For example, the CU-CP (e.g., CU-CP 210 in FIG. 2) and the CU-UP e.g., CU-UP 212 in FIG. 2) each may implement the RRC layer 405 and the PDCP layer 410. A DU (e.g., DUs 214 and 218 in FIG. 2) may implement the RLC layer 415 and the MAC layer 420. However, the DU may also implement the PHY layer(s) 425 and the RF layer(s) 430 via an AU/RRU connected to the DU. The PHY layers 425 may include a high PHY layer and a low PHY layer.

The UE (e.g., UE 222a-222c) may implement the entire communications protocol stack 400 (e.g., the RRC layer 405, the PDCP layer 410, the RLC layer 415, the MAC layer 420, the PHY layer(s) 425, and the RF layer(s) 430).

Figure 5:
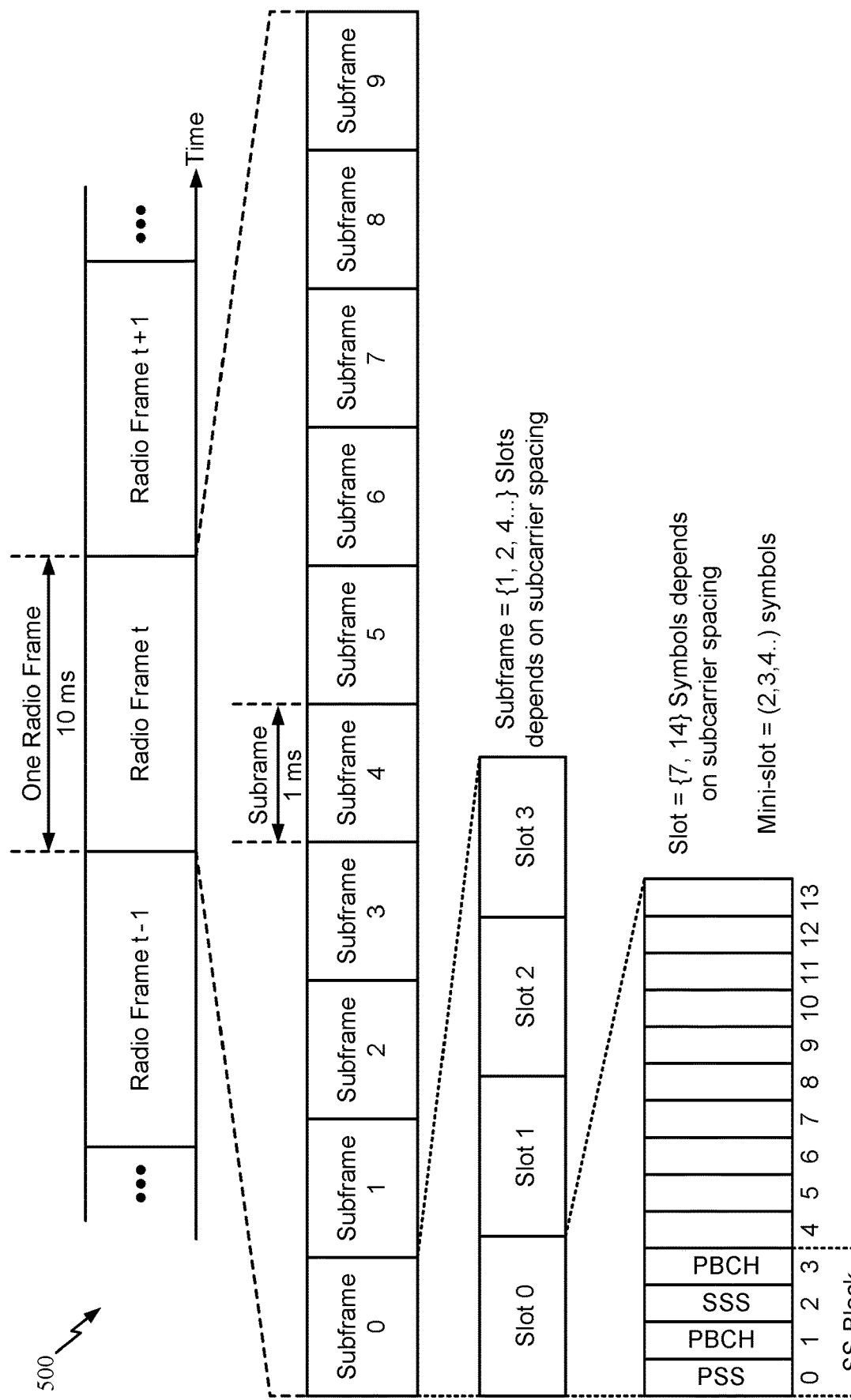
FIG. 5 is a block diagram is a diagram illustrating an example of a frame format for new radio (NR), in accordance with certain aspects of the present disclosure.

FIG. 5 is a diagram showing an example of a frame format 500 for NR. The transmission timeline for each of DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., the DL, the UL, or flexible) for data transmission and the link direction for each subframe may be dynamically switched. The link directions may be based on a slot format. Each slot may include DL/UL data as well as DL/UL control information.

In the NR, a SSB is transmitted. The SSB includes a PSS, a SSS, and a two symbol PBCH. The SSB can be transmitted in a fixed slot location, such as the symbols 0-3 as shown in FIG. 5. The PSS and the SSS may be used by UEs for cell search and acquisition. The PSS may provide half-frame timing, the SS may provide CP length and frame timing. The PSS and the SSS may provide cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs) such as system information block type 1 (SIB1), other system information (OSI) can be transmitted on a PDSCH in certain subframes. The SS block can be transmitted up to sixty-four times, for example, with up to sixty-four different beam directions for mmW. The up to sixty-four transmissions of the SS block are referred to as the SS burst set. The SS blocks in an SS burst set are transmitted in a same frequency region, while the SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through a scheduling entity (e.g., UE or AP), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a RRC dedicated state, etc.) or a configuration associated with transmitting pilots using a common set of resources (e.g., an RRC common state, etc.). When operating in the RRC dedicated state, the UE may select the dedicated set of resources for transmitting a pilot signal to a network. When operating in the RRC common state, the UE may select the common set of resources for transmitting the pilot signal to the network. In either case, the pilot signal transmitted by the UE may be received by one or more network access devices, such as an AN, or a DU, or portions thereof. Each receiving network access device may be configured to receive and measure the pilot signals transmitted on the common set of resources, and also receive and measure the pilot signals transmitted on the dedicated sets of resources allocated to the UEs for which the network access device is a member of a monitoring set of network access devices for the UE. One or more of the receiving network access devices, or a CU to which the receiving network access device(s) transmit the measurements of the pilot signals, may use the measurements to identify serving cells for the UEs, or to initiate a change of the serving cell for one or more of the UEs.

As used herein, the term En-gNB generally refers to a node providing NR user plane and control plane protocol terminations towards the UE, and acting as Secondary Node (SN) in an E-UTRAN NR Dual Connectivity (EN-DC) scenario. A Master Cell Group (MCG), in multi-RAT Dual Connectivity (MR-DC), generally refers to a group of serving cells associated with the Master Node (MN), and includes a special cell (SpCell) (Pcell) and optionally one or more Scells.

A Master node (MN), in MR-DC, generally refers to the radio access node that provides the control plane connection to the core network. An MN may be a Master eNB (in EN-DC), a Master ng-eNB (in NGEN-DC) or a Master gNB (in NE-DC). Multi-RAT Dual Connectivity (MR-DC) generally refers to dual Connectivity, for example, between E-UTRA and NR nodes. A primary cell (PCell) generally refers to an SpCell of a master cell group. A PSCell generally refers to a SpCell of a secondary cell group (SCG). A Secondary Cell Group, in MR-DC, generally refers to a group of serving cells associated with a Secondary Node (SN), and includes the SpCell (PSCell) and optionally one or more secondary cells (Scells).

A secondary node (SN), in MR-DC, generally refers to the radio access node, with no control plane connection to the core network, providing additional resources to the UE. An SN may be an EN-gNB (in EN-DC), a Secondary ng-eNB (in NE-DC) or a Secondary gNB (in NGEN-DC). An SpCell generally refers to a primary cell of a master or secondary cell group and supports PUCCH transmission and contention based Random access in addition, it is always activated.

Example Nested Conditional Mobility Procedure(s)

Aspects of the present disclosure provide apparatus, methods, processing systems, and computer readable mediums to perform a nested conditional mobility procedure. As noted above, the techniques presented herein may take advantage of devices that support both CHO and CPAC procedures in order to provide additional approaches for achieving high mobility robustness while reducing the signaling between UE and network.

Figure 6:
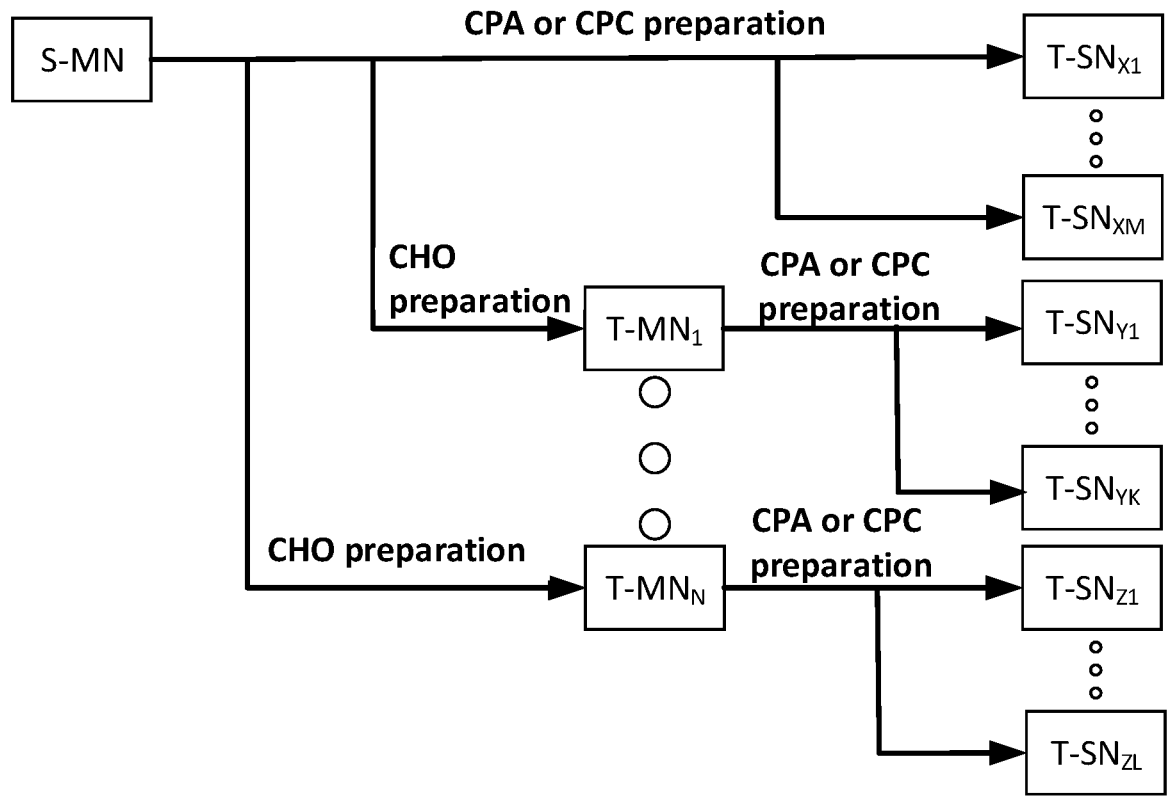
FIG. 6 is a block diagram illustrating an example nested mobility procedure scenario, in accordance with certain aspects of the present disclosure.

FIG. 6 is a block diagram illustrating an example nested conditional mobility procedure (CHO and CPAC) scenario, in accordance with certain aspects of the present disclosure. As illustrated, a source master node (S-MN) may prepare one or more candidate target secondary node (T-MNs) for CHO and may also prepare one or more target secondary nodes (T-SNs) for conditional PSCell addition (CPA) or conditional PSCell change (CPC). Furthermore, the target master nodes (T-MNs) may also contain the configuration for one or more target secondary nodes (T-MNs) for conditional PSCell addition (CPA) or conditional PSCell change (CPC) in a nested fashion. These nested conditional PSCell addition (CPA) or conditional PSCell change (CPC) configuration may be used by the UE upon successful completion of CHO with a T-MN.

The nested CHO and CPAC conditional procedures described herein may help enable efficient and flexible CPAC. For example, based on the measurement results and traffic load (e.g., RB configuration) information, an S-MN or a source SN (S-SN) may prepare a set of candidate PSCells for CPAC.

The techniques may also enable handover from standalone (SA) to MR-DC modes. For example, based on the measurement results and traffic load information in a Handover Request, each target MN may initiate CPA preparation with a set of candidate SNs.

The techniques may also enable conditional inter-MN handover with PSCell changes (using CPC) for various example scenarios for a UE configured for both CHO and CPAC. For example, one scenario is when the UE completes a CHO or CPAC (S-MN), whichever is triggered first. In this case, if CPC (corresponding to the S-MN) is triggered first, the UE performs CPC. Upon the CPC completion, the S-MN may notify all T-MNs about the PSCell change. If CHO is triggered first, the UE performs the CHO and, upon CHO completion, the nested CPC (T-MN) conditions are evaluated.

In a second scenario, the UE completes CHO or CPAC (S-MN), whichever is triggered first. In this case, even if CPAC (S-MN) is triggered first, if a CHO execution condition is met, then UE may prioritize the CHO procedure and suspend/terminates ongoing CPAC procedure.

In a third scenario, a UE (capable of performing CHO and CPAC in parallel), starts the procedure for CPAC and CHO in parallel, if both CHO and CPAC are triggered.

Figure 7:
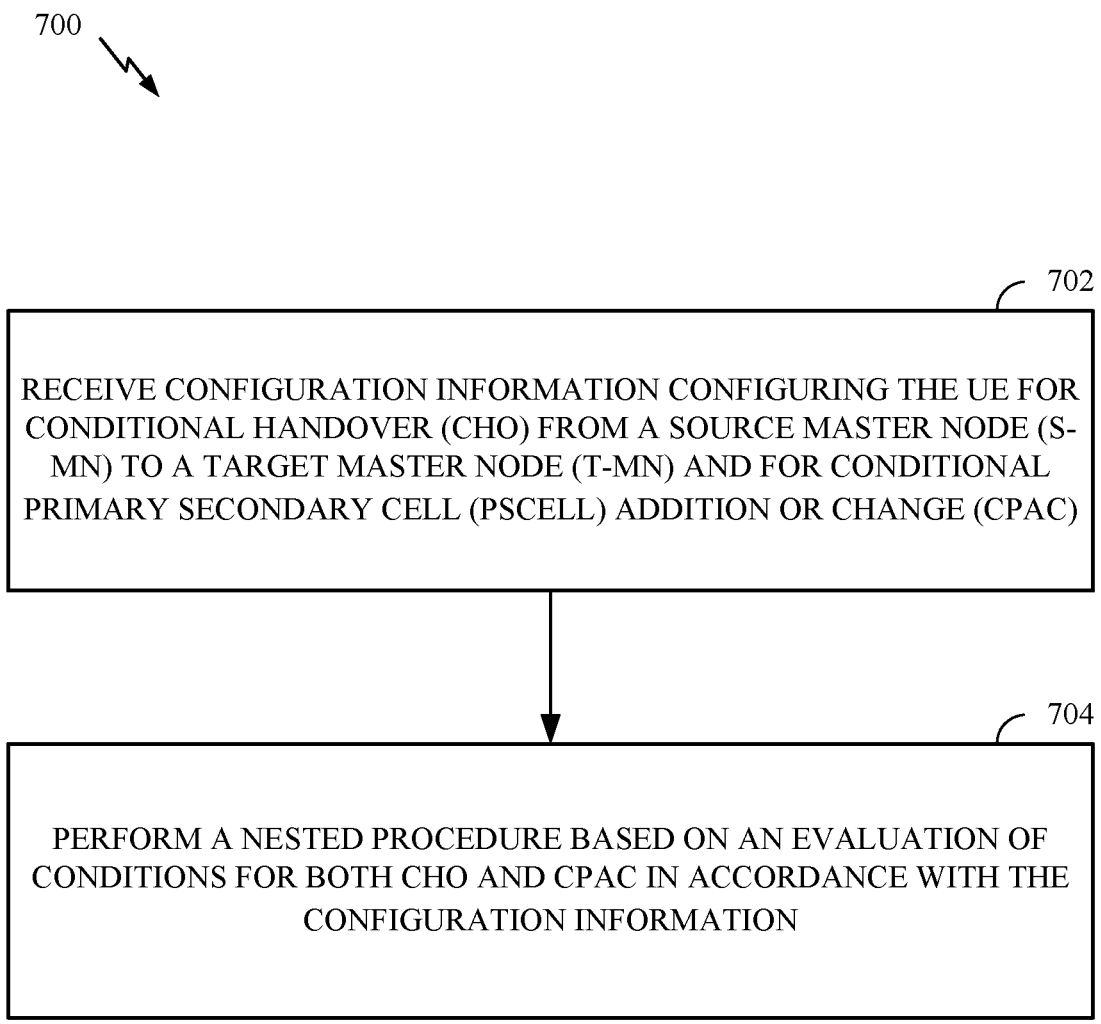
FIG. 7 illustrates example operations for wireless communications by a UE, in accordance with certain aspects of the present disclosure.

FIG. 7 illustrates example operations 700 for wireless communication by a UE, in accordance with certain aspects of the present disclosure. The operations 700 may be performed, for example, by a UE 120 of FIG. 1 or 2.

Operations 700 begin, at 702, by receiving configuration information configuring the UE for conditional handover (CHO) from a source master node (S-MN) to a target master node (T-MN) and for conditional primary secondary cell (PSCell) addition or change (CPAC). At 704, the UE performs a nested CHO and CPAC procedure (e.g., a nested procedure based on an evaluation of conditions for both CHO and CPAC) in accordance with the configuration information.

Figure 8:
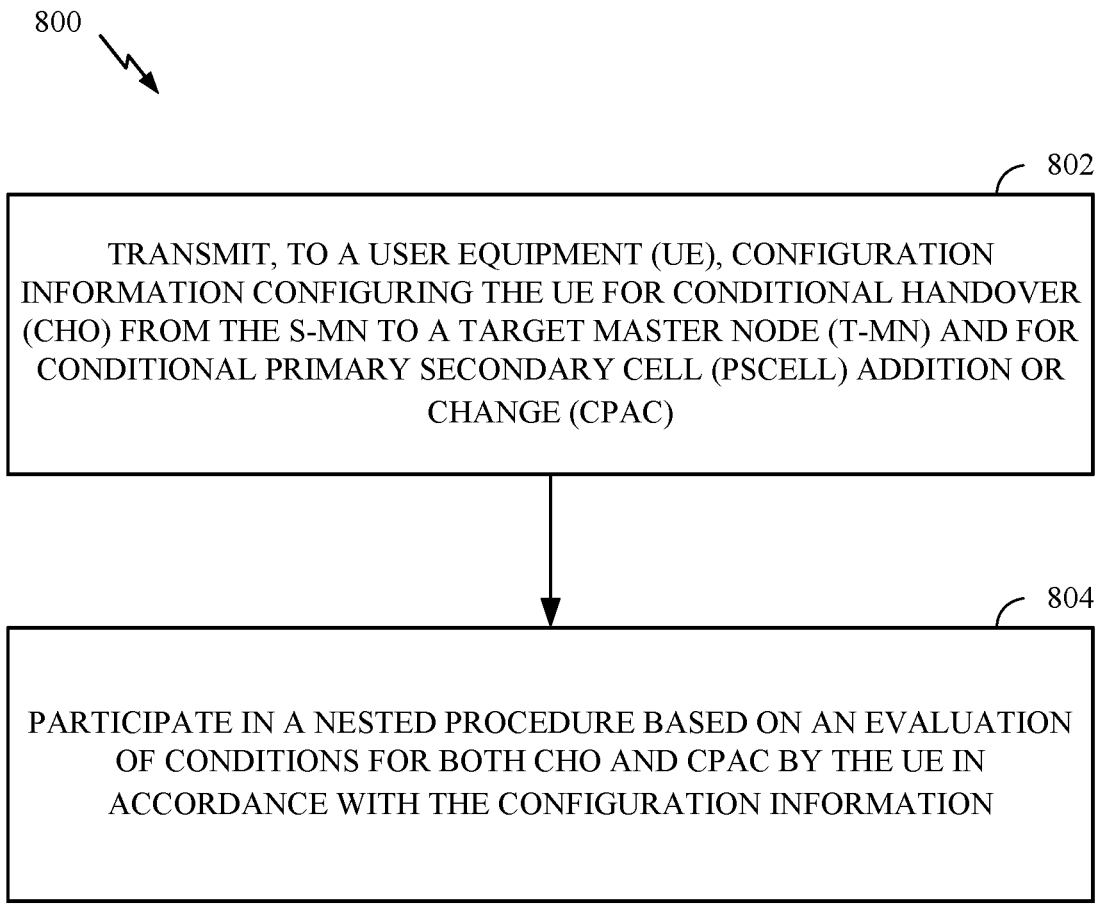
FIG. 8 illustrates example operations that may be performed by a source master node (S-MN), in accordance with certain aspects of the present disclosure.

FIG. 8 illustrates example operations 800 for wireless communication that may be considered complementary to operations 700 of FIG. 7. For example, operations 800 may be performed by an S-MN to configure a UE (performing operations 700 of FIG. 7) for nested conditional mobility (CHO/CAPC) procedures.

Operations 800 begin, at 802, by transmitting, to a user equipment (UE), configuration information configuring the UE for conditional handover (CHO) from the S-MN to a target master node (T-MN) and for conditional primary secondary cell (PSCell) addition or change (CPAC). For example, the S-MN may transmit the configuration information to the UE via an RRC reconfiguration message.

At 804, the S-MN participates in a nested procedure with the UE (based on an evaluation of conditions for both CHO and CPAC by the UE in accordance with the configuration information). For example, the S-MN may receive an RRC reconfiguration message from the UE indicating a CPAC execution is satisfied for one or more PSCells (a target secondary node or T-SN). The S-MN may then notify one or more T-MNs of the PSCell change. The S-MN may also send an SN Release request to the S-SN and send a SN Reconfiguration Complete message to the T-SN.

In the nested conditional mobility procedures presented herein, there are various options, depending on whether a CHO or CPAC is triggered first. There are even various options for when CPAC is triggered first.

For example, according to a first option when CPAC is triggered first, the UE may proceed to perform a CPAC procedure, even if a radio link failure (RLF) happens at the PCell (S-MN) or if a CHO condition is met for a candidate CHO cell.

A nested procedure according to this first option may be described with reference to the flow diagram of FIG. 9, the state diagram of FIG. 10, and the call flow diagram of FIG. 11.

Figure 9:
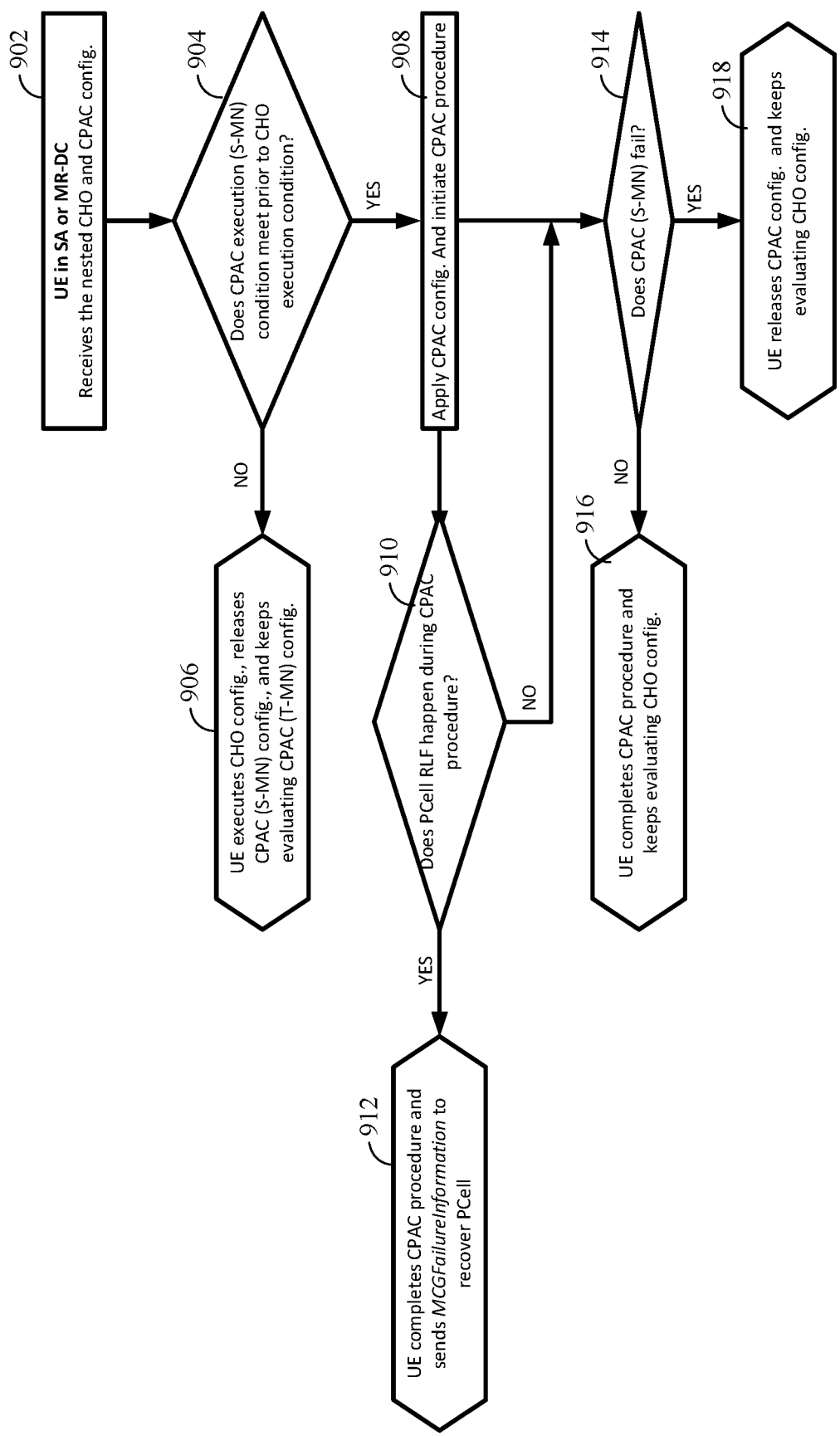
FIG. 9 illustrates an example flow diagram for a nested conditional mobility procedure, in accordance with certain aspects of the present disclosure.
Figure 10:
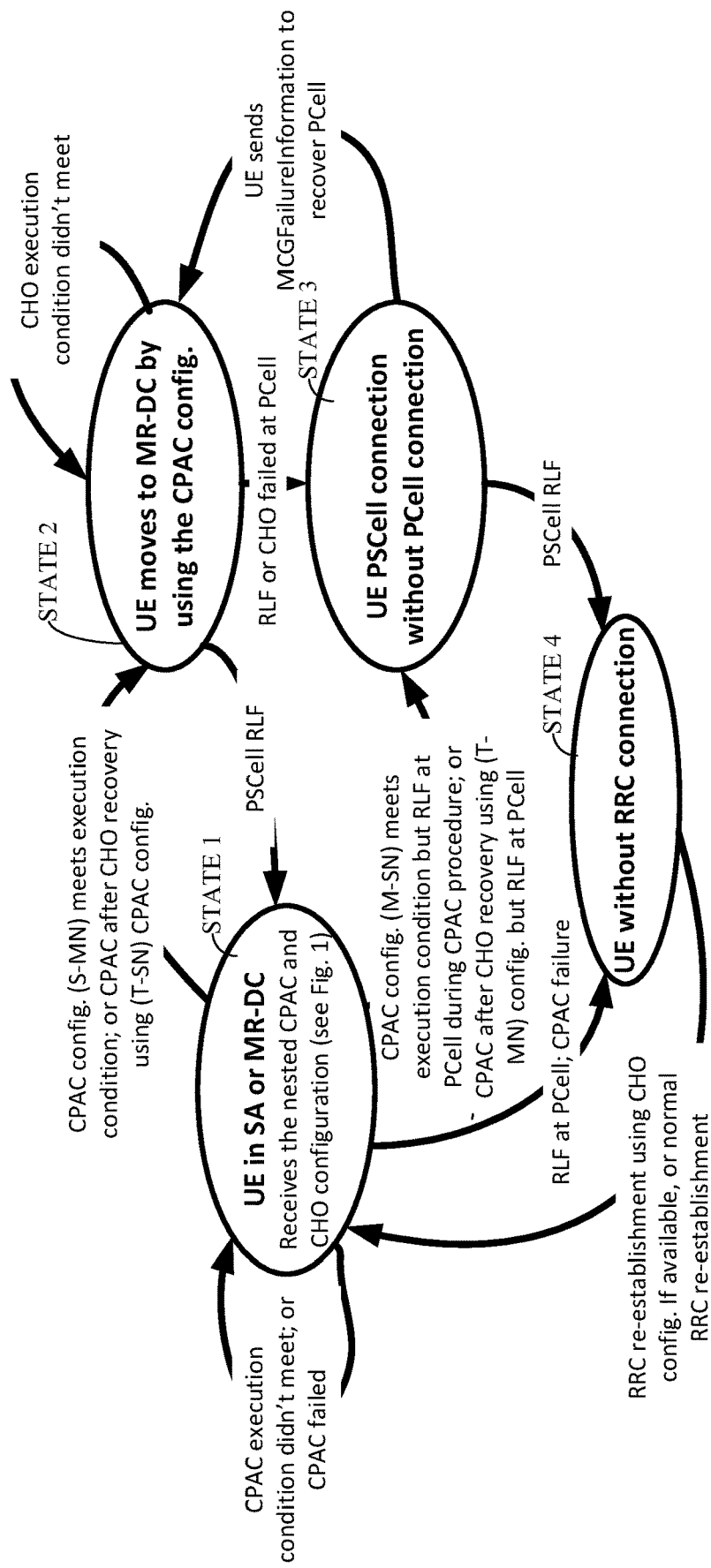
FIG. 10 illustrates an example state diagram for a nested conditional mobility procedure, in accordance with certain aspects of the present disclosure.

As illustrated, a UE in an SA or MR-DC may receive a nested CPAC and CHO configuration (e.g., at 902 of FIG. 9, corresponding to State 1 of FIG. 10).

Figure 11:
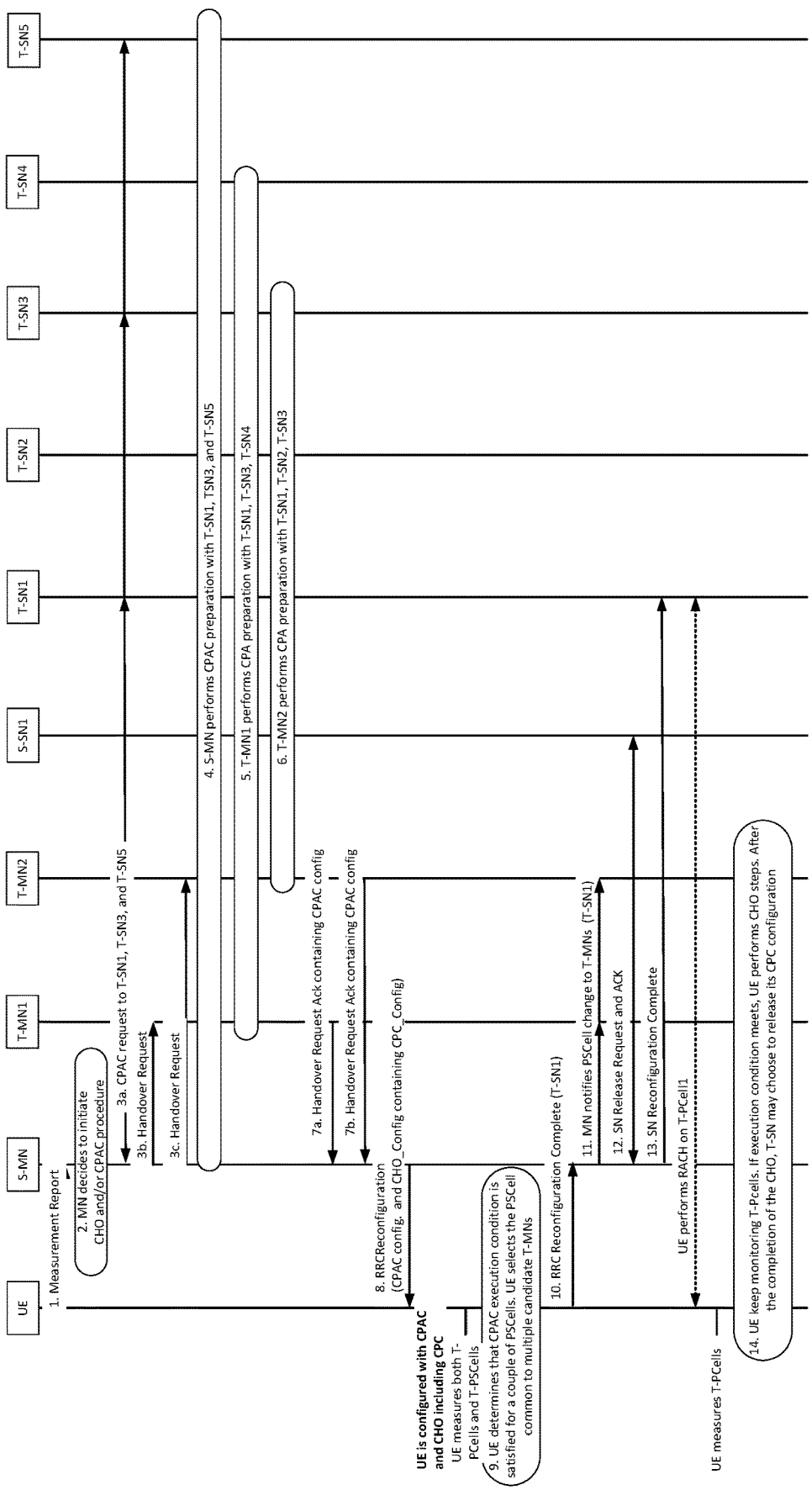
FIG. 11 illustrates an example call flow diagram for a nested conditional mobility procedure, in accordance with certain aspects of the present disclosure.

As shown in FIG. 11, the UE may receive the nested CPAC and CHO configuration via an RRC reconfiguration message from the S-MN after the S-MN decides to initiate a CHO and/or CPAC procedure. The S-MN may send a CPAC request to T-SNs (selected based on a measurement report) and send a handover request to one or more T-MNs. The S-MN may receive CPAC configuration information from one or more T-MNs, via a handover request acknowledgment message. The UE may measure both target PCells (T-PCells) and target PSCells (T-PSCells) to determine if any of the CPAC or CHO execution conditions are met.

Returning to FIG. 9, if a CPAC execution condition is not met prior to a CHO execution condition, as determined at 904, the UE may execute the CHO configuration, release the CPAC configuration, and keep evaluating the conditions per the CPAC configuration (at 906).

If a CPAC execution condition is met, the UE may apply the CPAC configuration and initiate a CPAC procedure, at 908. This corresponds to a transition from State 1 to State 2 in FIG. 10.

If a PCell RLF happens during the CPAC procedure, as determined at 910, the UE has a PSCell connection without PCell connection (State 3 in FIG. 10). In this case, at 912, the UE may still complete the CPAC procedure and attempt to recover the PCell (e.g., by sending MCGFailureInformation to the T-SN). If the PSCell connection fails, the UE is without RRC connection (State 4 in FIG. 10) and the UE may attempt RRC re-establishment using a CHO configuration.

If the CPAC (S-MN) does not fail, as determined at 914, the UE may complete the CPAC procedure and keep evaluating CHO execution conditions, at 916. If the CPAC (S-MN) fails, the UE may release the CPAC configuration and keep evaluating CHO execution conditions, at 918.

In some cases, one or more candidate T-SNs may be part of multiple T-MN CPC configurations. In such cases, as indicated in step 9 in the call flow diagram of FIG. 11, if an execution condition for multiple T-SNs are met, the UE may select a candidate T-SN that is part of multiple T-MNs CPC configurations. In such cases, the T-MN may choose to retain, modify, or release nested CPC configurations.

As illustrated in FIG. 11, upon CPAC completion, the S-MN may notify the PSCell change to the T-MNs.

According to a second option when CPAC is triggered first, if a CHO is triggered after, the UE may prioritize the CHO to avoid an RLF.

Figure 12:
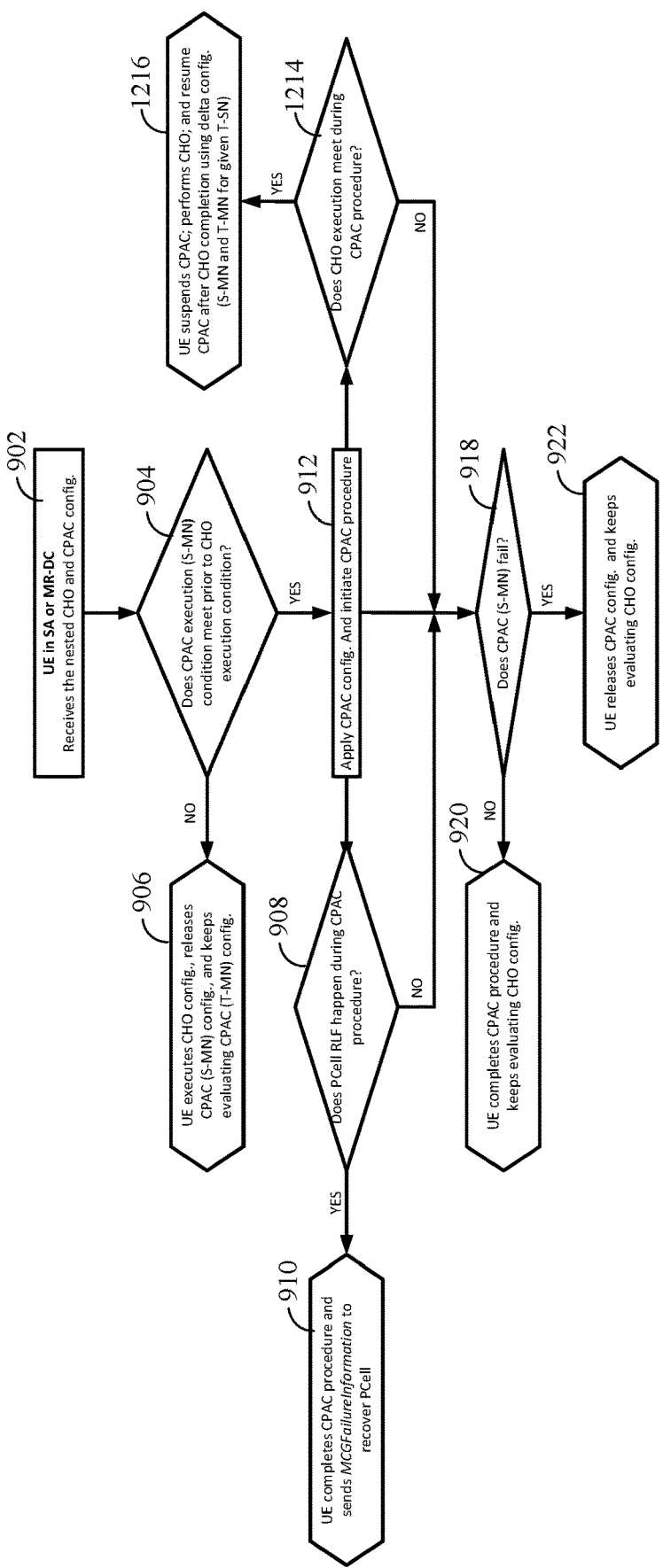
FIG. 12 illustrates an example flow diagram for a nested conditional mobility procedure, in accordance with certain aspects of the present disclosure.
Figure 13:
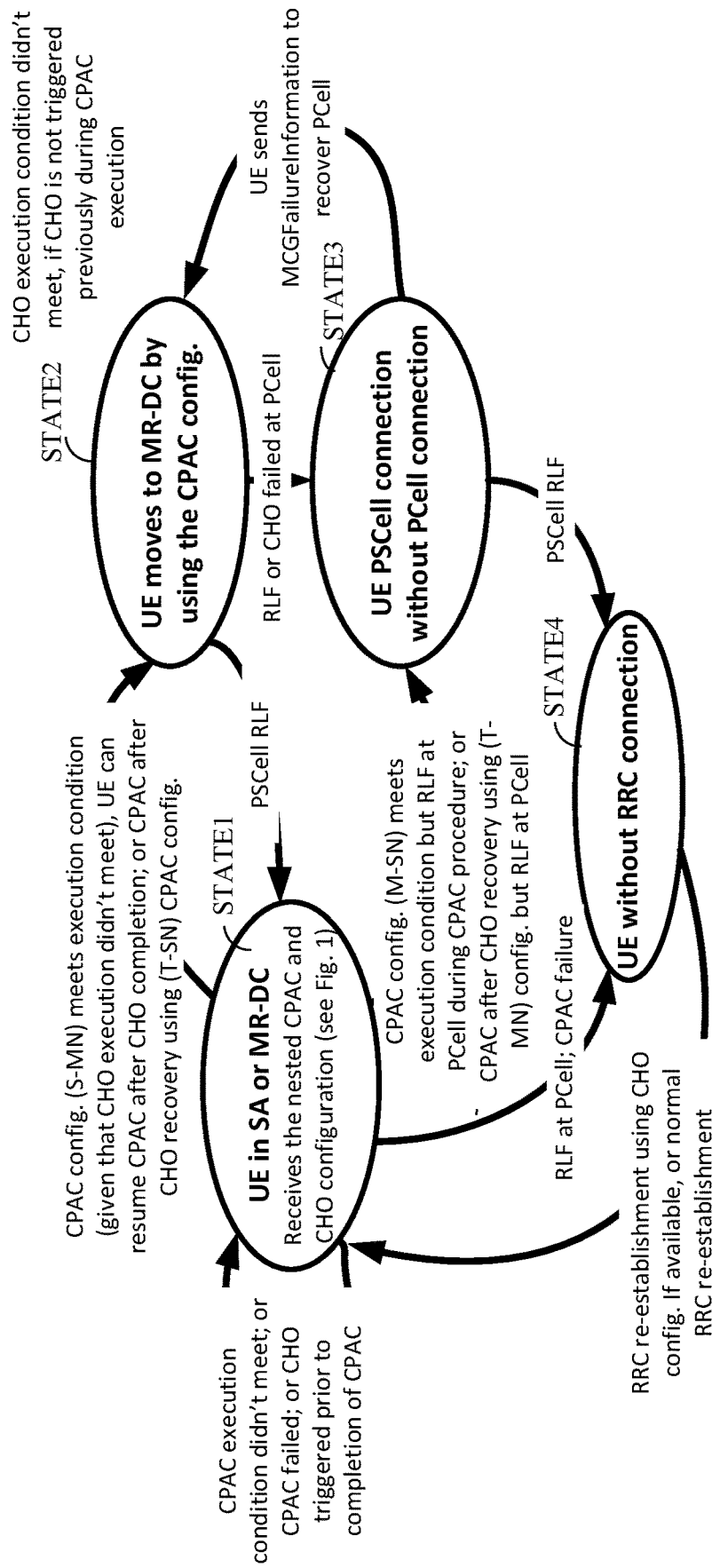
FIG. 13 illustrates an example state diagram for a nested conditional mobility procedure, in accordance with certain aspects of the present disclosure.

For example, as illustrated in FIG. 12, the UE may suspend or pause the CPAC procedure in order to prioritize CHO executions. When comparing FIG. 12 to FIG. 9, extra steps are taken, at 1214 to check if CHO execution conditions are met during the CPAC procedure and, if so, at 1216, the UE suspends the CPAC procedure, performs the CHO, and resumes CPAC after CHO completion using a delta configuration (S-MN and T-MN for given T-SN). As shown in the state diagram of FIG. 13, the UE can transition to State 2, when the CPAC configuration (S-MN) execution condition is met (given that CHO execution didn't meet), the UE can resume CPAC after CHO completion or can perform CPAC after CHO recovery using (T-SN) CPAC configuration.

UE may resume the CPAC procedure completion using the CPAC nested configuration received, where the UE implement deltas configuration to resume the CPAC procedure. IF the CHO fails, the UE may resume CPAC procedure and recovers PCell using MCGFailureInformation. If both CHO and CPAC fails, the UE may perform an RRC re-establishment procedure.

Figure 14:
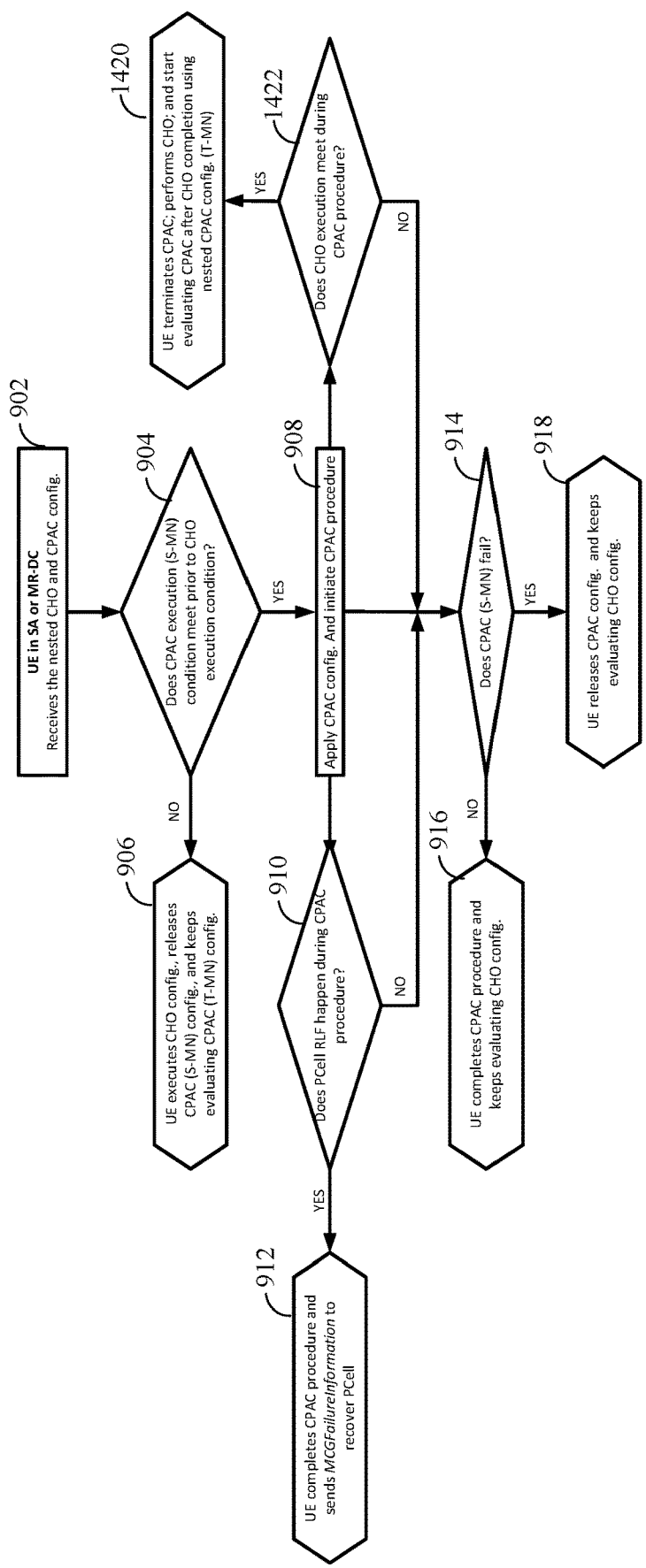
FIG. 14 illustrates an example flow diagram for a nested conditional mobility procedure, in accordance with certain aspects of the present disclosure.
Figure 15:
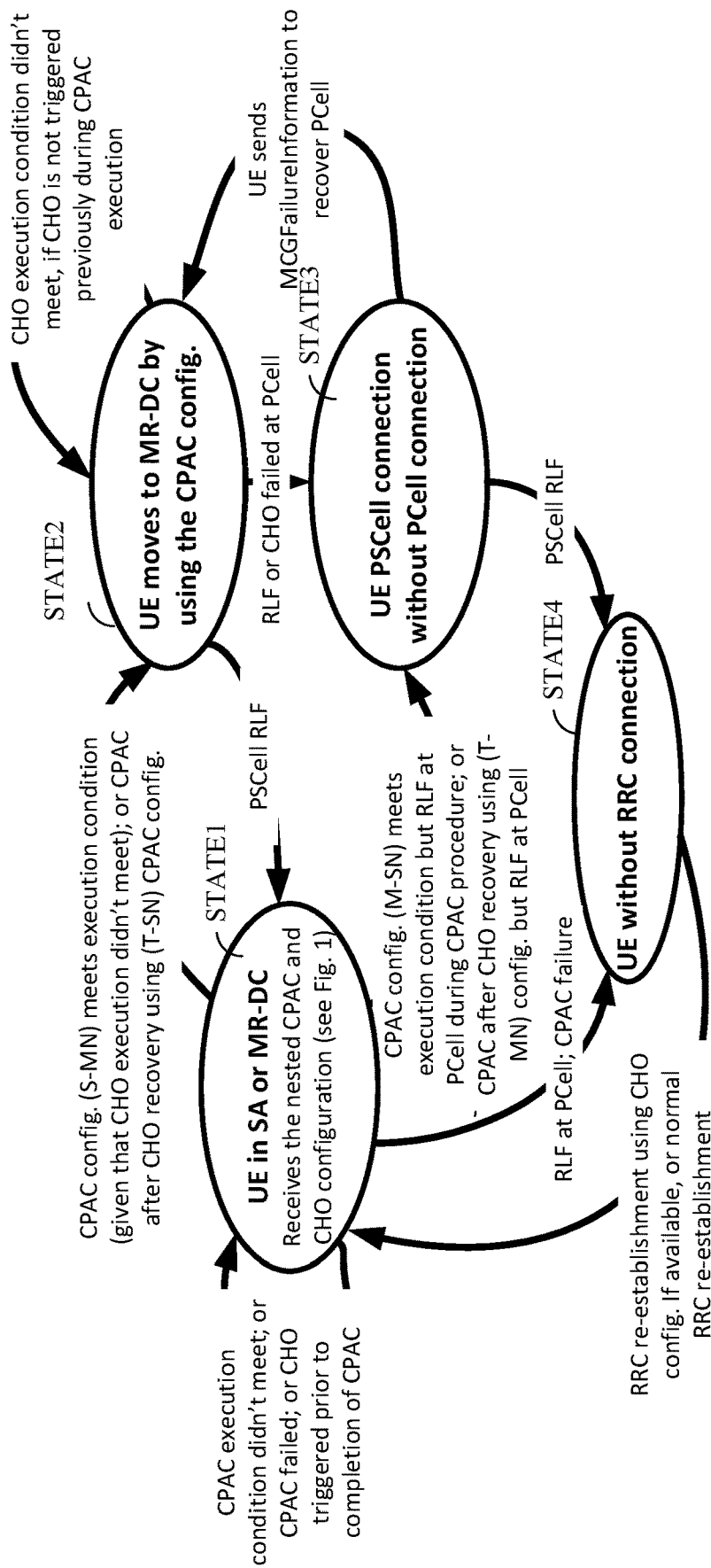
FIG. 15 illustrates an example state diagram for a nested conditional mobility procedure, in accordance with certain aspects of the present disclosure.

In some cases, as illustrated in FIG. 14, if CHO execution conditions are met during the CPAC procedure, as determined at 1414, the UE may terminate the CPAC procedure in order to prioritize CHO executions, at 1416. As shown in the state diagram of FIG. 15, the UE can transition to State 2, when the CPAC configuration (S-MN) execution condition is met (given that CHO execution didn't meet) or may perform CPAC after CHO recovery using (T-SN) per a CPAC configuration.

Figure 16:
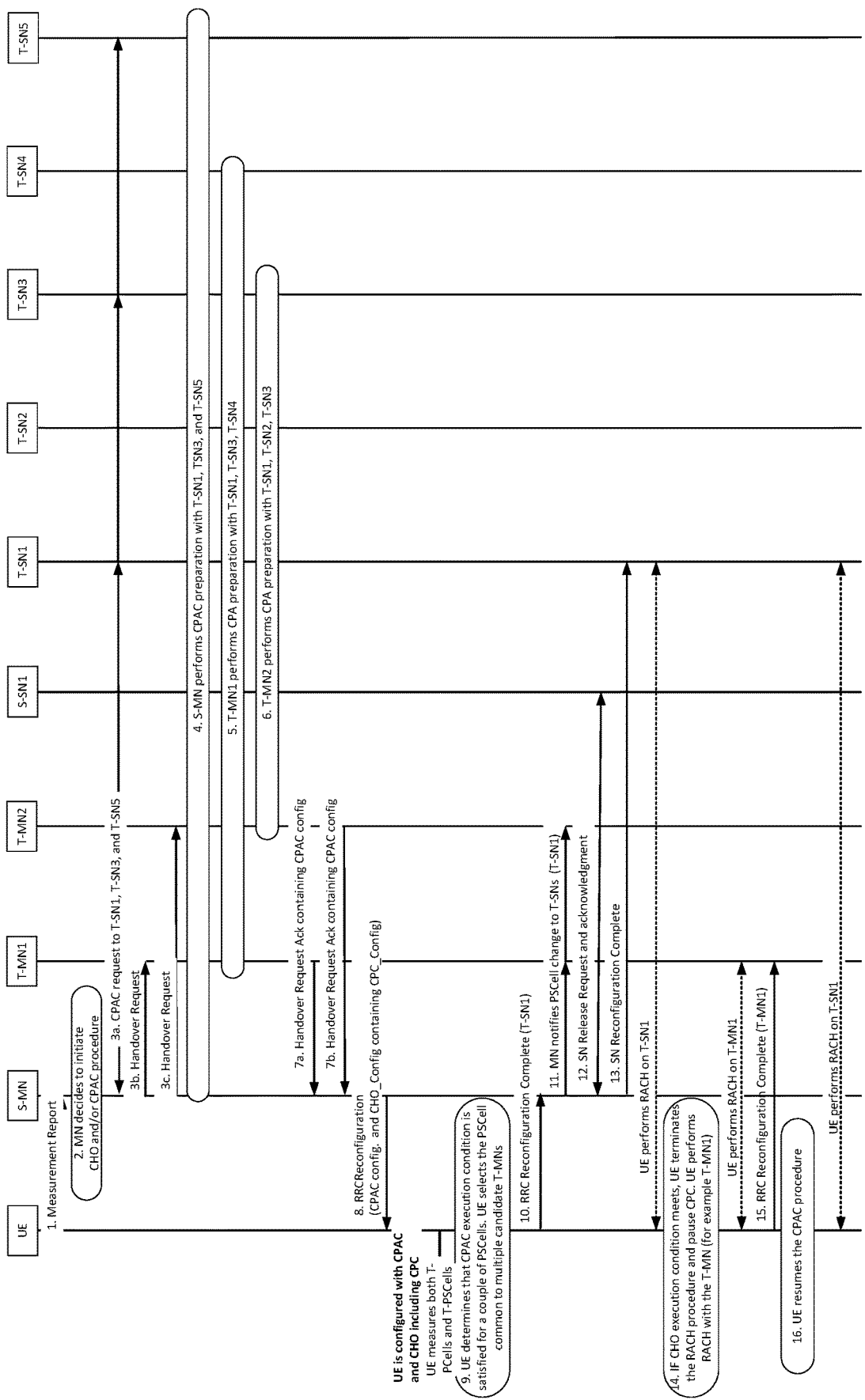
FIG. 16 illustrates an example call flow diagram for a nested conditional mobility procedure, in accordance with certain aspects of the present disclosure.

As shown in the call flow diagram of FIG. 16, upon the triggering of the CPAC execution condition, the UE notifies the S-MN of the identity of the T-SN for which UE has initiated CPAC procedures. In turn, the S-MN notifies T-MNs if the CPC condition is triggered and if the CPC configuration is provided by the T-MNs in the nested configuration.

Figure 17:
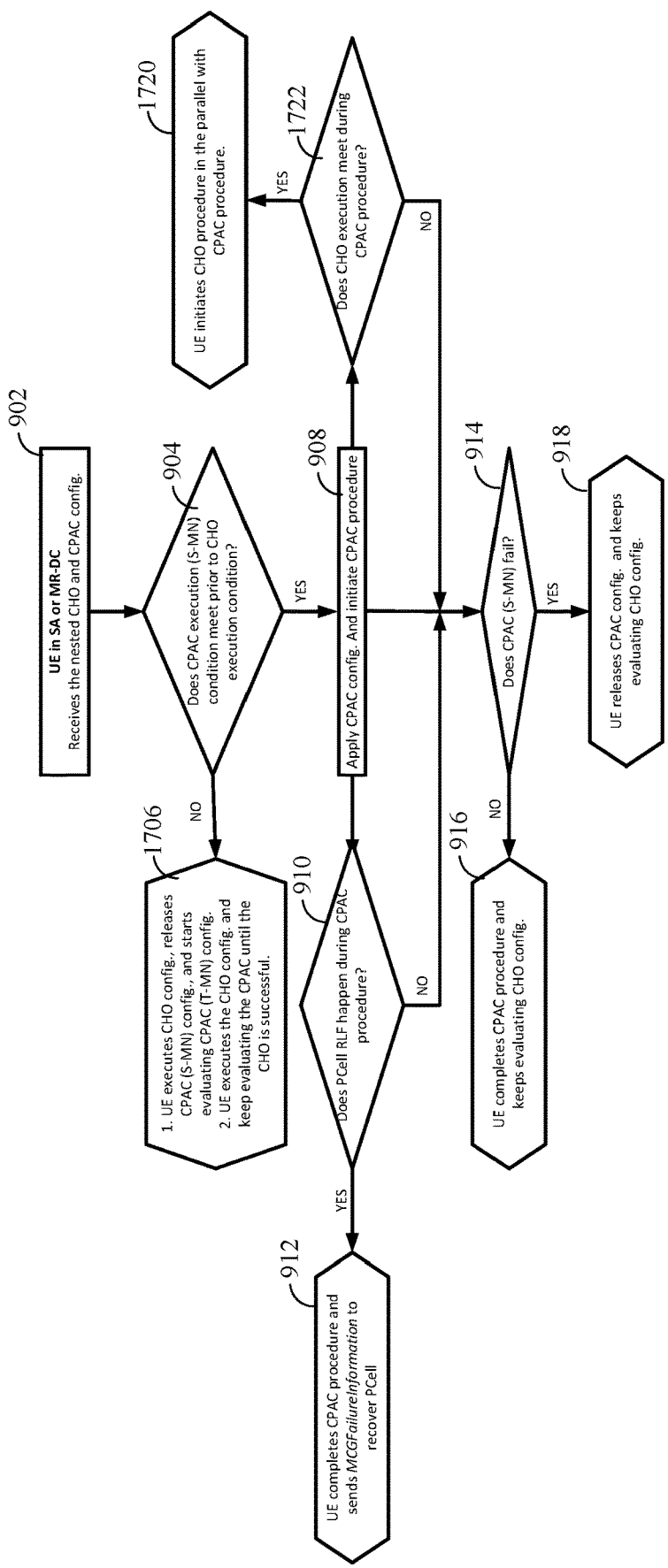
FIG. 17 illustrates an example flow diagram for a nested conditional mobility procedure, in accordance with certain aspects of the present disclosure.

According to a third option, as illustrated in FIG. 17, if CHO execution conditions are met during the CPAC procedure, as determined at 1714, the UE may initiate the CHO process in parallel, at 1716.

One possible scenario for this option is that if CHO is triggered first, the UE releases CPAC (S-MN) configuration. Another possible scenario is that if CHO is triggered first, the UE keeps evaluating the CPAC (S-MN) conditions until CHO successfully completes. If CPAC (S-MN) execution conditions are met, the UE may perform CPAC execution in parallel with CHO. UE releases CPAC configuration upon successful completion of CHO.

Figure 18:
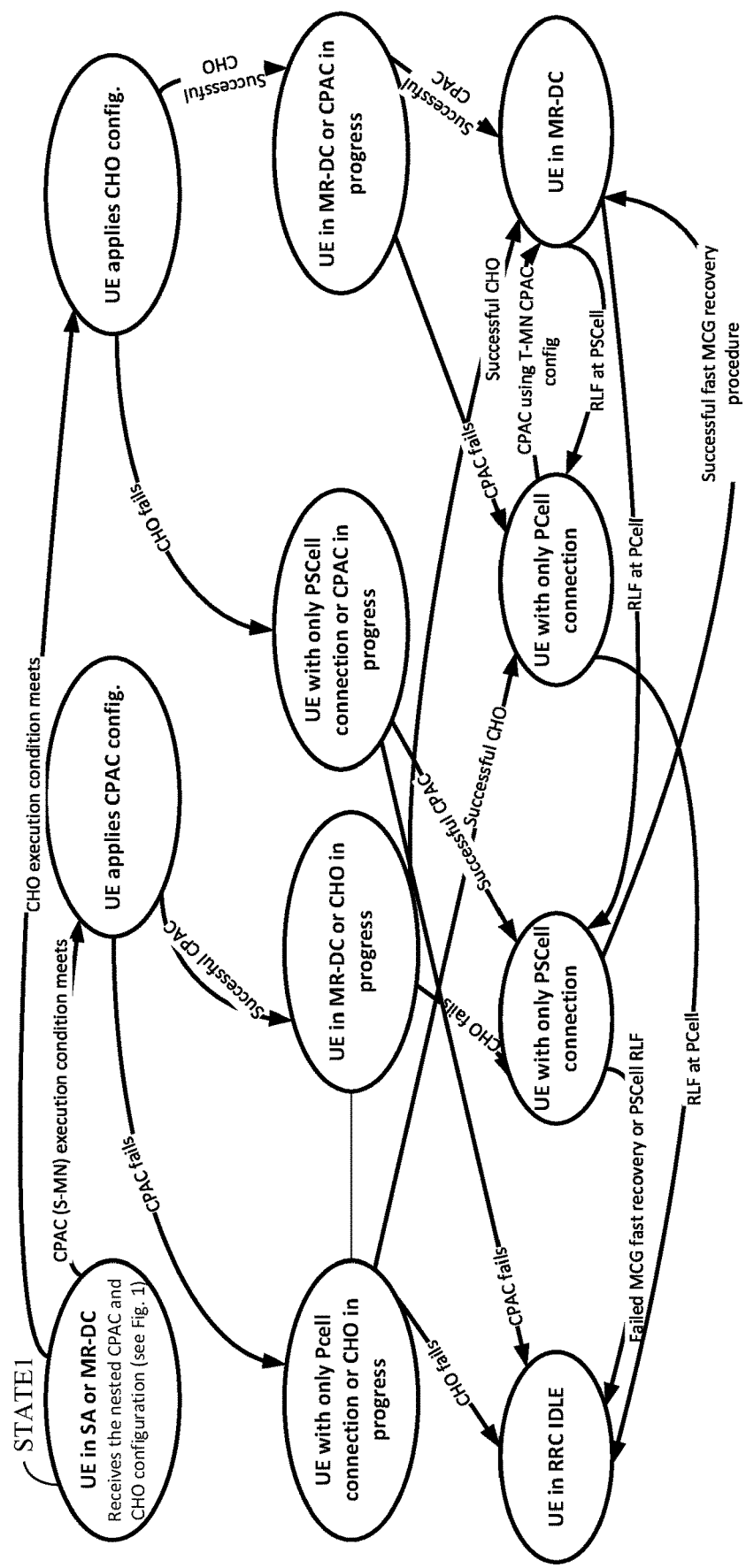
FIG. 18 illustrates an example state diagram for a nested conditional mobility procedure, in accordance with certain aspects of the present disclosure.

FIG. 18 shows an example state diagram for a UE capable of performing CPAC and CHO in parallel. As illustrated, if the CHO fails while performing CPAC and CHO in parallel, the UE may be with only PSCell connection or with the CPAC in progress. If the CPAC is in progress, the UE may go to RRC IDLE if the CPAC ultimately fails or may transition to operating with only a PSCell connection if the CPAC is successful.

If the CHO succeeds while performing CPAC and CHO in parallel, the UE may go to MR-DC mode or a mode with CPAC in progress. If the CPAC is in progress when the CHO succeeds, the UE may move to MR-DC if the CPAC is successful or may be with only a PCell connection if the CPAC fails.

As illustrated, if the CPAC fails while performing CHO in parallel, the UE may be with only PCell connection or with the CHO in progress. If the CHO is in progress, the UE may go to RRC IDLE if the CHO ultimately fails or may transition to operating with only a PCell connection if the CHO is successful.

Figure 19:
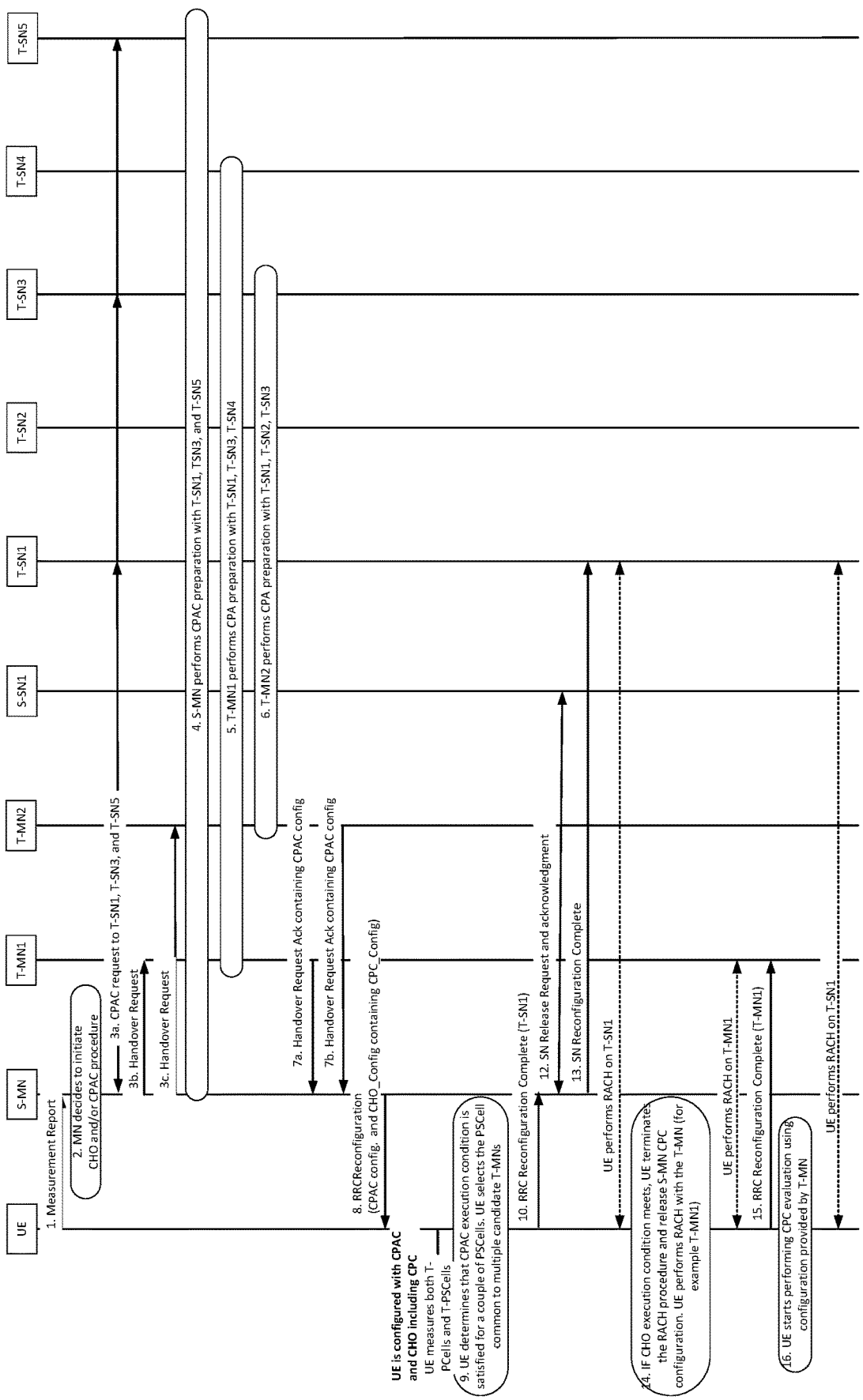
FIG. 19 illustrates an example call flow diagram for a nested conditional mobility procedure, in accordance with certain aspects of the present disclosure.
Figure 20:
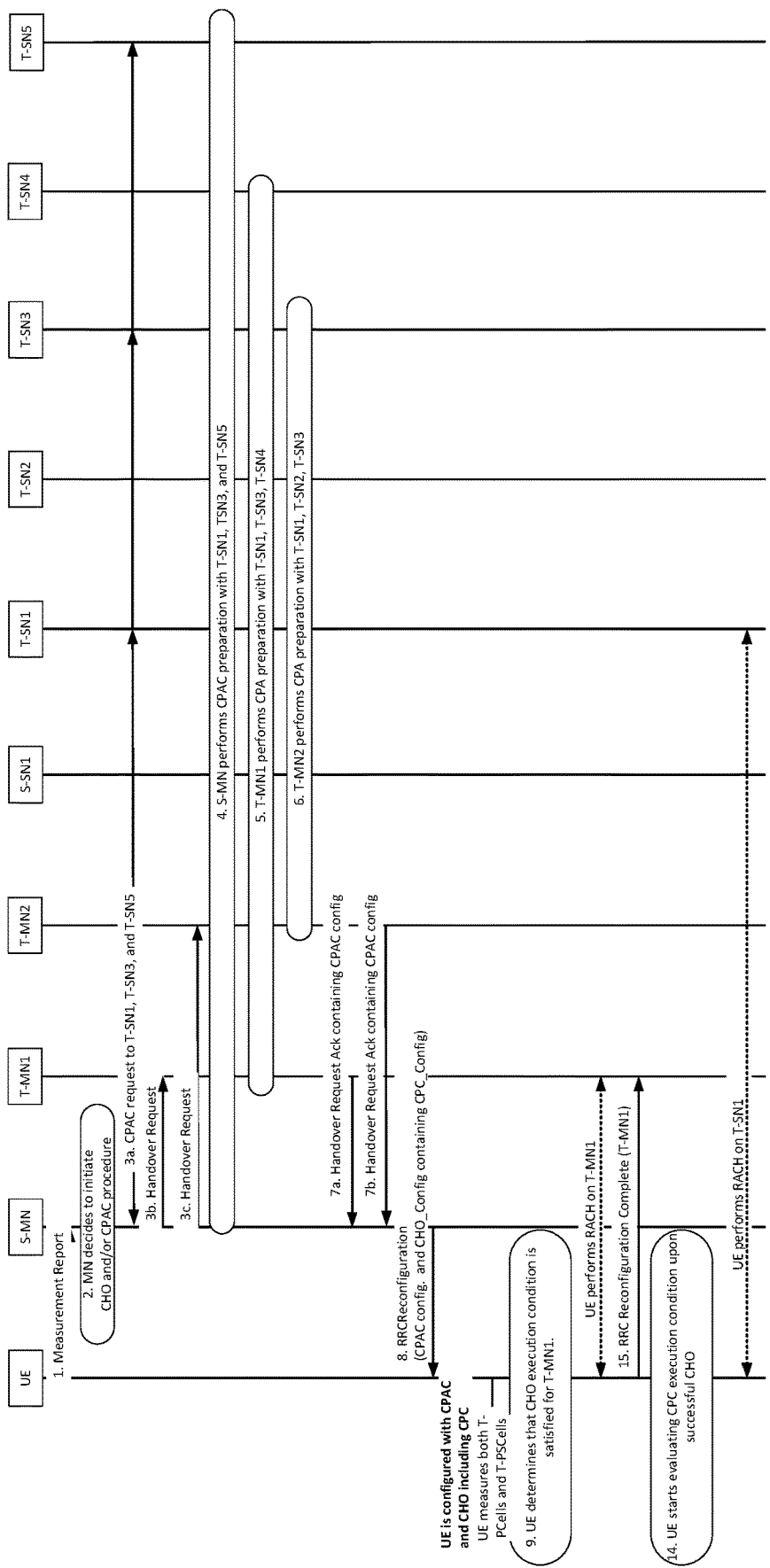
FIG. 20 illustrates an example call flow diagram for a nested conditional mobility procedure, in accordance with certain aspects of the present disclosure.

If the CPAC succeeds while performing CPAC and CHO in parallel, the UE may go to MR-DC mode or a mode with CHO in progress. If the CHO is in progress when the CPAC succeeds, the UE may move to MR-DC if the CHO is successful or may be with only a PSCell connection if the CHO fails As shown in the call flow diagram of FIG. 19, the UE may release an ongoing CPC procedure upon CHO detection. The UE may reinitiate a CPC procedure on the completion of CHO procedure using the CPC configuration provided by the T-MN. The UE can release parts of a nested CHO and CPAC configuration upon successful RACH to T-MN (e.g., the UE can release other T-MN and corresponding CPC configurations). As shown in the call flow diagram of FIG. 20, if CHO is triggered first, the UE can release parts of nested CHO and CPAC configuration upon successful RACH to T-MN (e.g., the UE may release other T-MN and corresponding CPC configurations.

Figure 21:
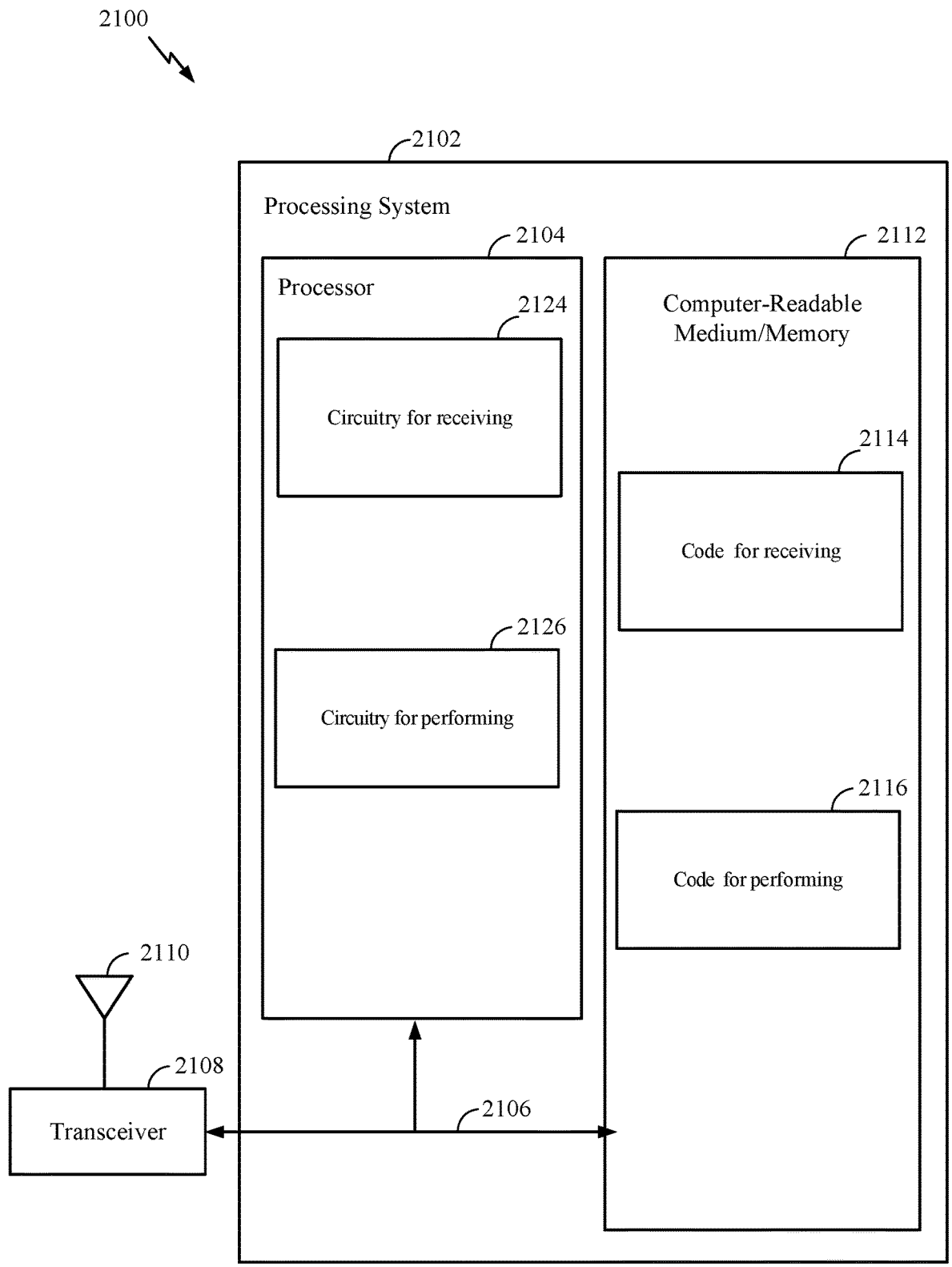
FIG. 21 illustrates a communications device that may include various components configured to perform operations for techniques disclosed herein, in accordance with aspects of the present disclosure.

FIG. 21 illustrates an example communications device 2100 that may include various components (e.g., corresponding to means-plus-function components) configured to perform operations for the techniques disclosed herein. For example, the device 2100 may be a UE configured to perform operations illustrated in FIG. 7. The communications device 2100 includes a processing system 2102 coupled to a transceiver 2108 (e.g., a transmitter and/or a receiver). The transceiver 2108 is configured to transmit and receive signals for the communications device 2100 via an antenna 2110, such as the various signals as described herein. The processing system 2102 may be configured to perform processing functions for the communications device 2100, including processing signals received and/or to be transmitted by the communications device 2100.

The processing system 2102 includes a processor 2104 coupled to a computer-readable medium/memory 2112 via a bus 2106. In certain aspects, the computer-readable medium/memory 2112 is configured to store instructions (e.g., computer-executable code) that when executed by the processor 2104, cause the processor 2104 to perform the operations illustrated in FIG. 7, or other operations for performing the various techniques discussed herein. In certain aspects, computer-readable medium/memory 2112 stores code 2114 for receiving (that may be used to perform the various receiving operations of FIG. 7); and code 2116 for performing (that may be used to perform the various performing operations of FIG. 7). In certain aspects, the processor 1304 has circuitry configured to implement the code stored in the computer-readable medium/memory 1312. The processor 1304 includes circuitry 1324 for receiving (that may be used to perform the various receiving operations of FIG. 7); and circuitry 1326 for performing (that may be used to perform the various performing operations of FIG. 7).

Figure 22:
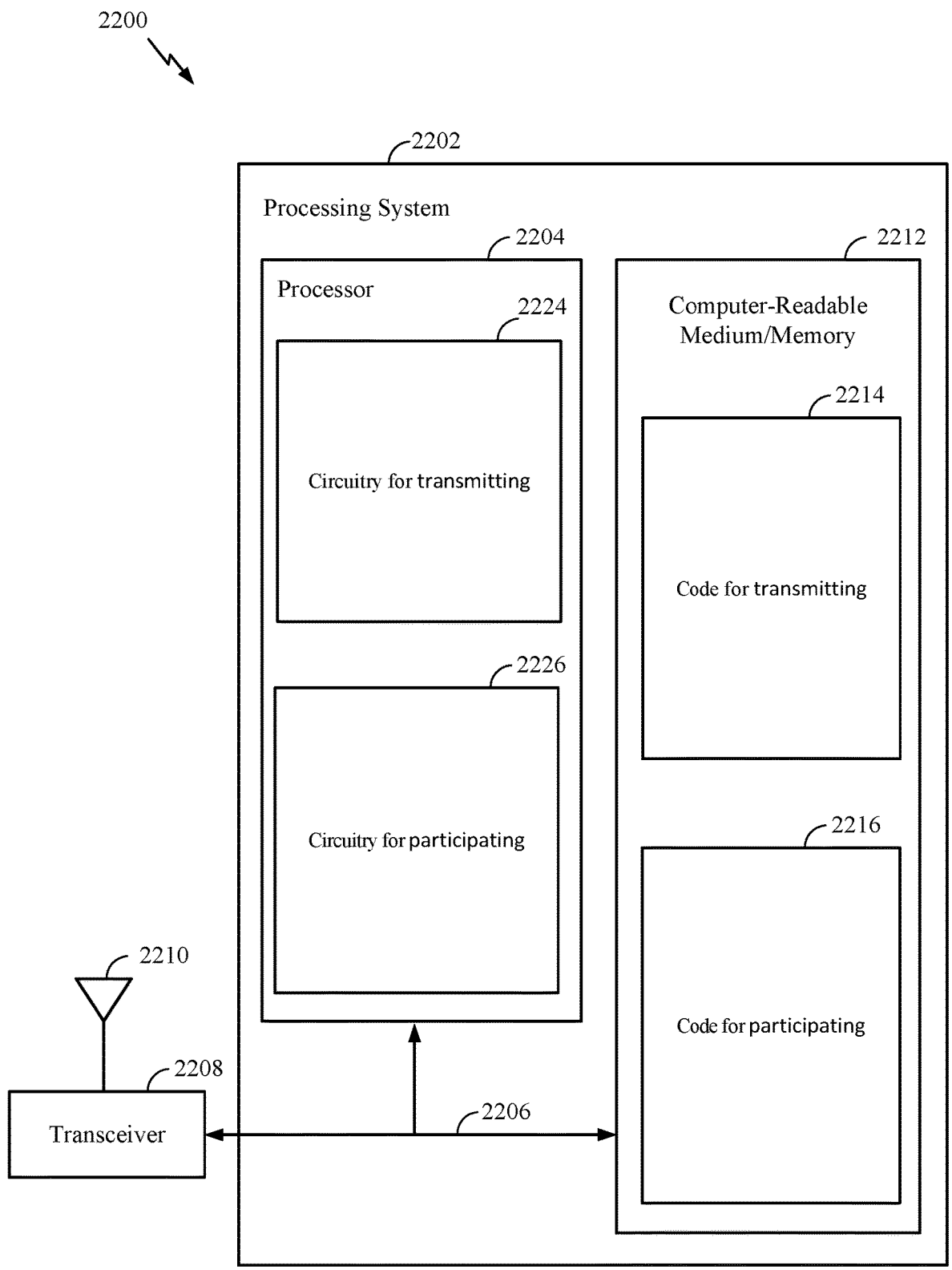
FIG. 22 illustrates a communications device that may include various components configured to perform operations for techniques disclosed herein, in accordance with aspects of the present disclosure.

FIG. 22 illustrates an example communications device 2200 that may include various components (e.g., corresponding to means-plus-function components) configured to perform operations for the techniques disclosed herein. For example, the device 2200 may be a source MN configured to perform operations illustrated in FIG. 8. The communications device 2200 includes a processing system 2202 coupled to a transceiver 2208 (e.g., a transmitter and/or a receiver). The transceiver 2208 is configured to transmit and receive signals for the communications device 2200 via an antenna 2210, such as the various signals as described herein. The processing system 2202 may be configured to perform processing functions for the communications device 2200, including processing signals received and/or to be transmitted by the communications device 2200.

The processing system 2202 includes a processor 2204 coupled to a computer-readable medium/memory 2212 via a bus 2206. In certain aspects, the computer-readable medium/memory 2212 is configured to store instructions (e.g., computer-executable code) that when executed by the processor 2204, cause the processor 2204 to perform the operations illustrated in FIG. 8, or other operations for performing the various techniques discussed herein. In certain aspects, computer-readable medium/memory 2212 stores code 2214 for transmitting (that may be used to perform the various transmitting operations of FIG. 8); and code 2216 for participating (that may be used to perform the various participating operations of FIG. 8). In certain aspects, the processor 2204 has circuitry configured to implement the code stored in the computer-readable medium/memory 2212. The processor 2204 includes circuitry 2224 for transmitting (that may be used to perform the various transmitting operations of FIG. 8); and circuitry 2226 for participating (that may be used to perform the various participating operations of FIG. 8).

Example Aspects

In addition to the various aspects described above, specific combinations of aspects are within the scope of the disclosure, some of which are detailed below:

Aspect 1: A method for wireless communications by a user equipment (UE), comprising: receiving configuration information configuring the UE for conditional handover (CHO) from a source master node (S-MN) to a target master node (T-MN) and for conditional primary secondary cell (PSCell) addition or change (CPAC); and performing a nested procedure based on an evaluation of conditions for both CHO and CPAC in accordance with the configuration information.

Aspect 2: The method of Aspect 1, wherein performing the nested procedure comprises at least one of: completing a CHO procedure, if the evaluation of conditions indicates the CHO procedure is triggered before a CPAC procedure is triggered; or completing a CPAC procedure, if the evaluation of conditions indicates the CPAC procedure is triggered before a CHO procedure is triggered.

Aspect 3: The method of any one of Aspects 1-2, wherein performing the nested procedure comprises: prioritizing a CHO procedure over a CPAC procedure, even if the evaluation of conditions indicates the CPAC procedure is triggered before the CHO procedure.

Aspect 4: The method of any one of Aspects 1-3, wherein performing the nested procedure comprises: performing a CHO procedure and CPAC procedure in parallel, if the evaluation of conditions triggers both the CHO procedure and the CPAC procedure.

Aspect 5: The method of any one of Aspects 1-4, wherein performing the nested procedure comprises: performing a CPAC procedure, if the evaluation of conditions indicates the CPAC procedure is triggered before a CHO procedure, without regard to a radio link failure (RLF) at an S-MN.

Aspect 6: The method of Aspect 5, wherein performing the nested procedure comprises performing the CPAC procedure even if the evaluation of conditions indicates a CHO procedure is triggered.

Aspect 7: The method of Aspect 5, further comprising: recovering a primary cell (PCell) using master cell group (MCG) failure information if a radio link failure (RLF) is detected during the CPAC procedure.

Aspect 8: The method of any one of Aspects 1-7, wherein performing the nested procedure comprises: initiating a CPAC procedure, if the evaluation of conditions indicates the CPAC procedure is triggered before a CHO procedure and prioritizing the CHO procedure, if the evaluation of conditions subsequently indicates the CHO procedure is triggered after the CPAC procedure.

Aspect 9: The method of Aspect 8, wherein prioritizing the CHO procedure comprises: pausing or suspending the CPAC procedure; and performing the CHO procedure while the CPAC procedure is paused or suspended.

Aspect 10: The method of Aspect 9, further comprising: resuming the CPAC procedure if the CHO procedure fails; and recovering primary cell (PCell) using master cell group (MCG) failure information.

Aspect 11: The method of Aspect 9, further comprising: resuming the CPAC procedure if the CHO procedure fails; and performing a radio resource control (RRC) re-establishment procedure if the CPAC procedure also fails.

Aspect 12: The method of Aspect 7, wherein prioritizing the CHO procedure comprises: terminating the CPAC procedure; and performing the CHO procedure after terminating the CPAC procedure.

Aspect 13: The method of Aspect 12, further comprising: evaluating nested CPAC conditions after completing the CHO procedure.

Aspect 14: The method of any one of Aspects 1-13, wherein performing the nested procedure comprises: if the evaluation of conditions indicates a CHO procedure is triggered while a CPAC procedure is in progress, initiating the CHO procedure in parallel with the CPAC procedure.

Aspect 15: The method of any one of Aspects 1-14, wherein receiving the configuration information comprises: receiving a radio resource control (RRC) reconfiguration message with a CPAC configuration and a CHO configuration containing a conditional PSCell change (CPC) configuration.

Aspect 16: A method for wireless communications by a source master node (S-MN), comprising: transmitting, to a user equipment (UE), configuration information configuring the UE for conditional handover (CHO) from the S-MN to a target master node (T-MN) and for conditional primary secondary cell (PSCell) addition or change (CPAC); and participating in a nested procedure with the UE based on an evaluation of conditions for both CHO and CPAC by the UE in accordance with the configuration information.

Aspect 17: The method of Aspect 16, wherein the configuration information configures the UE to perform the nested procedure by: performing a CPAC procedure, if the evaluation of conditions indicates the CPAC procedure is triggered before a CHO procedure, without regard to a radio link failure (RLF) at an S-MN.

Aspect 18: The method of Aspect 17, further comprising: notifying one or more T-MNs of at least one target secondary node (T-SN) cell identity upon the initialization or completion of the CPAC procedure.

Aspect 19: The method of any one of Aspects 16-18, wherein the configuration information configures the UE to perform the nested procedure by: initiating a CPAC procedure, if the evaluation of conditions indicates the CPAC procedure is triggered before a CHO procedure and prioritizing the CHO procedure, if the evaluation of conditions subsequently indicates the CHO procedure is triggered after the CPAC procedure.

Aspect 20: The method of Aspect 19, further comprising: notifying one or more T-MNs of at least one target secondary node (T-SN) cell identity upon the initialization of the CPAC procedure.

Aspect 21: An apparatus, comprising: a memory comprising computer-executable instructions; one or more processors configured to execute the computer-executable instructions and cause the apparatus to perform a method in accordance with any one of Aspects 1-20.

Aspect 22: An apparatus, comprising means for performing a method in accordance with any one of Aspects 1-20.

Aspect 23: A non-transitory computer-readable medium comprising computer-executable instructions that, when executed by one or more processors of an apparatus, cause the apparatus to perform a method in accordance with any one of Aspects 1-20.

Aspect 24: A computer program product embodied on a computer-readable storage medium comprising code for performing a method in accordance with any one of Aspects 1-20

Additional Considerations

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Means for receiving or means for obtaining may include a receiver (such as the receive processor 338) or an antenna(s) 334 of the BS 110 or the receive processor 358 or antenna(s) 352 of the UE 120 illustrated in FIG. 3. Means for transmitting or means for outputting may include a transmitter (such as the transmit processor 320) or an antenna(s) 334 of the BS 110 or the transmit processor 364 or antenna(s) 352 of the UE 120 illustrated in FIG. 3. Means for associating, means for determining, means for monitoring, means for deciding, means for providing, means for detecting, means for performing, and/or means for setting may include a processing system, which may include one or more processors, such as the receive processor 338/358, the transmit processor 320/364, the TX MIMO processor 330/366, or the controller 340/380 of the BS 110 and the UE 120 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a memory comprising instructions; and
   one or more processors coupled with the memory and configured to execute the instructions and cause the apparatus to:
      receive configuration information configuring the apparatus for conditional handover (CHO) from a source master node (S-MN) to a target master node (T-MN) and for conditional primary secondary cell (PSCell) addition or change (CPAC); and
      perform a nested procedure based on an evaluation of conditions for both CHO and CPAC in accordance with the configuration information, wherein the one or more processors are configured to cause the apparatus to:
         initiate a CHO procedure in parallel with a CPAC procedure if the evaluation of the conditions triggers both the CHO procedure and the CPAC procedure;
         perform the CPAC procedure, if the evaluation of the conditions indicates the CPAC procedure is triggered before a CHO procedure, without regard to a radio link failure (RLF) at the S-MN;
         perform the CPAC procedure even if the evaluation of the conditions indicates the CHO procedure is triggered;
         perform the CHO procedure if the evaluation of the conditions indicates the CHO procedure is triggered while the CPAC procedure is in progress; and
         recover a primary cell (PCell) using master cell group (MCG) failure information if the RLF is detected during the CPAC procedure.

2. The apparatus of claim 1, wherein the one or more processors being configured to perform the nested procedure comprises the one or more processors being configured to at least one of:
   complete the CHO procedure if the evaluation of the conditions indicates the CHO procedure is triggered before the CPAC procedure is triggered; or
   complete the CPAC procedure if the evaluation of the conditions indicates the CPAC procedure is triggered before the CHO procedure is triggered.

3. The apparatus of claim 1, wherein the one or more processors are further configured to cause the apparatus to evaluate nested CPAC conditions after completing the CHO procedure.

4. The apparatus of claim 1, wherein the one or more processors being configured to cause the apparatus to receive the configuration information comprises the one or more processors being configured to cause the apparatus to receive a radio resource control (RRC) reconfiguration message with a CPAC configuration and a CHO configuration containing a conditional PSCell change (CPC) configuration.

5. The apparatus of claim 1, further comprising a transceiver via which the configuration information is received, wherein the apparatus is configured as a user equipment.

6. A source master node (S-MN), comprising:
   a transceiver;
   a memory comprising instructions; and
   one or more processors configured to execute the instructions and cause the S-MN to:
      transmit, via the transceiver, configuration information configuring a user equipment (UE) for conditional handover (CHO) from the S-MN to a target master node (T-MN) and for conditional primary secondary cell (PSCell) addition or change (CPAC);
      participate in a nested procedure based on an evaluation of conditions for both CHO and CPAC by the UE in accordance with the configuration information; and
      notify one or more T-MNs of at least one target secondary node (T-SN) cell identity upon initialization or completion of a CPAC procedure, wherein:
         the configuration information configures the UE to perform the nested procedure by performing the CPAC procedure if the evaluation of the conditions indicates the CPAC procedure is triggered before a CHO procedure, without regard to a radio link failure (RLF) at the S-MN.

7. The S-MN of claim 6, wherein the one or more processors being configured to cause the S-MN to transmit the configuration information comprises the one or more processors being configured to cause the S-MN to transmit a radio resource control (RRC) reconfiguration message with a CPAC configuration and a CHO configuration containing a conditional PSCell change (CPC) configuration.

8. A method for wireless communications at a user equipment (UE), comprising:
   receiving configuration information configuring the UE for conditional handover (CHO) from a source master node (S-MN) to a target master node (T-MN) and for conditional primary secondary cell (PSCell) addition or change (CPAC); and performing a nested procedure based on an evaluation of conditions for both CHO and CPAC in accordance with the configuration information, the performing the nested procedure comprises:

performing a CPAC procedure, if the evaluation of the conditions indicates the CPAC procedure is triggered before a CHO procedure, without regard to a radio link failure (RLF) at the S-MN;

performing the CPAC procedure even if the evaluation of the conditions indicates the CHO procedure is triggered;

performing the CHO procedure if the evaluation of the conditions indicates the CHO procedure is triggered while the CPAC procedure is in progress; and recovering a primary cell (PCell) using master cell group (MCG) failure information if the RLF is detected during the CPAC procedure.

9. The method of claim 8, wherein performing the nested procedure comprises at least one of:

completing the CHO procedure if the evaluation of the conditions indicates the CHO procedure is triggered before the CPAC procedure is triggered; or completing the CPAC procedure if the evaluation of the conditions indicates the CPAC procedure is triggered before the CHO procedure is triggered.

10. The method of claim 8, wherein performing the nested procedure comprises prioritizing the CHO procedure over the CPAC procedure, even if the evaluation of the conditions indicates the CPAC procedure is triggered before the CHO procedure.

11. The method of claim 8, wherein performing the nested procedure comprises performing the CHO procedure and the CPAC procedure in parallel if the evaluation of the conditions triggers both the CHO procedure and the CPAC procedure.

12. The method of claim 8, wherein performing the nested procedure comprises:

initiating the CPAC procedure if the evaluation of the conditions indicates the CPAC procedure is triggered before the CHO procedure and prioritizing the CHO procedure if the evaluation of the conditions subsequently indicates the CHO procedure is triggered after the CPAC procedure.

13. The method of claim 12, wherein prioritizing the CHO procedure comprises:

pausing or suspending the CPAC procedure; and performing the CHO procedure while the CPAC procedure is paused or suspended.

14. An apparatus for wireless communications, comprising:

a memory comprising instructions; and one or more processors configured to execute the instructions and cause the apparatus to:

receive configuration information configuring the apparatus for conditional handover (CHO) from a source master node (S-MN) to a target master node (T-MN) and for conditional primary secondary cell (PSCell) addition or change (CPAC); and perform a nested procedure based on an evaluation of conditions for both CHO and CPAC in accordance with the configuration information, wherein the one or more processors are configured to cause the apparatus to:

perform a CPAC procedure if the evaluation of the conditions indicates the CPAC procedure is triggered before a CHO procedure, without regard to a radio link failure (RLF) at the S-MN;

perform the CPAC procedure even if the evaluation of the conditions indicates the CHO procedure is triggered; and recover a primary cell (PCell) using master cell group (MCG) failure information if the RLF is detected during the CPAC procedure.

15. The apparatus of claim 14, further comprising a transceiver via which the configuration information is received, wherein the apparatus is configured as a user equipment.

16. The apparatus of claim 14, wherein the one or more processors being configured to cause the apparatus to receive the configuration information comprises the one or more processors being configured to cause the apparatus to receive a radio resource control (RRC) reconfiguration message with a CPAC configuration and a CHO configuration containing a conditional PSCell change (CPC) configuration.

17. The apparatus of claim 14, wherein the one or more processors being configured to perform the nested procedure comprises the one or more processors being configured to at least one of:

complete the CHO procedure if the evaluation of the conditions indicates the CHO procedure is triggered before the CPAC procedure is triggered; or complete the CPAC procedure if the evaluation of the conditions indicates the CPAC procedure is triggered before the CHO procedure is triggered.

18. The apparatus of claim 14, wherein the one or more processors are further configured to cause the apparatus to evaluate nested CPAC conditions after completing the CHO procedure.

19. The apparatus of claim 14, wherein the one or more processors being configured to cause the apparatus to perform the nested procedure comprises the one or more processors being configured to cause the apparatus to perform the CHO procedure and CPAC procedure in parallel if the evaluation of the conditions triggers both the CHO procedure and the CPAC procedure.

20. An apparatus for wireless communications, comprising:

a memory comprising instructions; and one or more processors configured to execute the instructions and cause the apparatus to:

receive configuration information configuring the apparatus for conditional handover (CHO) from a source master node (S-MN) to a target master node (T-MN) and for conditional primary secondary cell (PSCell) addition or change (CPAC); and perform a nested procedure based on an evaluation of conditions for both CHO and CPAC in accordance with the configuration information, wherein the one or more processors being configured to cause the apparatus to:

perform a CPAC procedure if the evaluation of the conditions indicates the CPAC procedure is triggered before a CHO procedure, without regard to a radio link failure (RLF) at the S-MN; and recover a primary cell (PCell) using master cell group (MCG) failure information if the RLF is detected during the CPAC procedure.

21. The apparatus of claim 20, further comprising a transceiver via which the configuration information is received, wherein the apparatus is configured as a user equipment.

22. The apparatus of claim 20, wherein the one or more processors being configured to cause the apparatus to receive the configuration information comprises the one or more processors being configured to cause the apparatus to receive a radio resource control (RRC) reconfiguration message with a CPAC configuration and a CHO configuration containing a conditional PSCell change (CPC) configuration.

23. The apparatus of claim 20, wherein the one or more processors being configured to perform the nested procedure comprises the one or more processors being configured to at least one of:
complete the CHO procedure if the evaluation of the conditions indicates the CHO procedure is triggered before the CPAC procedure is triggered; or
complete the CPAC procedure if the evaluation of the conditions indicates the CPAC procedure is triggered before the CHO procedure is triggered.

24. The apparatus of claim 20, wherein the one or more processors are further configured to cause the apparatus to evaluate nested CPAC conditions after completing the CHO procedure.

25. The apparatus of claim 20, wherein the one or more processors being configured to cause the apparatus to perform the nested procedure comprises the one or more processors being configured to cause the apparatus to perform the CHO procedure and CPAC procedure in parallel if the evaluation of the conditions triggers both the CHO procedure and the CPAC procedure.

26. A source master node (S-MN), comprising:
a transceiver;
a memory comprising instructions; and
one or more processors configured to execute the instructions and cause the S-MN to:
transmit, via the transceiver, configuration information configuring a user equipment (UE) for conditional handover (CHO) from the S-MN to a target master node (T-MN) and for conditional primary secondary cell (PSCell) addition or change (CPAC);
participate in a nested procedure based on an evaluation of conditions for both CHO and CPAC by the UE in accordance with the configuration information; and
notify one or more T-MNs of at least one target secondary node (T-SN) cell identity upon initialization of a CPAC procedure, wherein the configuration information configures the UE to perform the nested procedure by:
initiating the CPAC procedure, if the evaluation of the conditions indicates the CPAC procedure is triggered before a CHO procedure; and
prioritizing the CHO procedure, if the evaluation of the conditions subsequently indicates the CHO procedure is triggered after the CPAC procedure.

27. The S-MN of claim 26, wherein the one or more processors being configured to cause the S-MN to transmit the configuration information comprises the one or more processors being configured to cause the S-MN to transmit a radio resource control (RRC) reconfiguration message with a CPAC configuration and a CHO configuration containing a conditional PSCell change (CPC) configuration.

* * * * *